United States Patent
Renaud et al.

(10) Patent No.: US 10,565,149 B2
(45) Date of Patent: Feb. 18, 2020

(54) STANDARDIZED HOT-PLUGGABLE TRANSCEIVING UNIT, HOSTING UNIT AND METHOD FOR APPLYING DELAYS BASED ON PORT POSITIONS

(71) Applicant: EMBRIONIX DESIGN INC, Laval (CA)

(72) Inventors: Lavoie Renaud, Laval (CA); Leclerc Normand, Saint-Jean sur Richelieu (CA)

(73) Assignee: EMBRIONIX DESIGN INC., Laval (CA)

( * ) Notice: Subject to any disclaimer, the term of this patent is extended or adjusted under 35 U.S.C. 154(b) by 0 days.

(21) Appl. No.: 15/990,737

(22) Filed: May 28, 2018

(65) Prior Publication Data
US 2019/0310960 A1 Oct. 10, 2019

Related U.S. Application Data

(60) Provisional application No. 62/653,842, filed on Apr. 6, 2018.

(51) Int. Cl.
*G06F 13/42* (2006.01)
*G06F 13/40* (2006.01)

(52) U.S. Cl.
CPC .......... *G06F 13/4081* (2013.01); *G06F 13/42* (2013.01)

(58) Field of Classification Search
None
See application file for complete search history.

(56) References Cited

U.S. PATENT DOCUMENTS

| | | | |
|---|---|---|---|
| 6,539,026 B1 | 3/2003 | Waclawsky | |
| 8,891,513 B1 * | 11/2014 | Huang | H04L 45/64 370/352 |
| 8,996,900 B2 * | 3/2015 | Vetteth | G06F 15/16 713/323 |
| 9,608,865 B2 | 3/2017 | McLoughlin et al. | |
| 2006/0239285 A1 * | 10/2006 | Nomura | H04J 3/0682 370/408 |
| 2008/0089364 A1 | 4/2008 | Barry et al. | |
| 2016/0173267 A1 * | 6/2016 | Zhang | H04L 69/28 709/248 |
| 2017/0026193 A1 * | 1/2017 | Thompson | G08B 27/005 |
| 2018/0039411 A1 * | 2/2018 | Stenfort | G06F 3/061 |

* cited by examiner

*Primary Examiner* — Elias Mamo
(74) *Attorney, Agent, or Firm* — IP Delta Plus Inc.

(57) ABSTRACT

Transceiving and hosting units applying delays based on port positions. The transceiving unit is adapted for insertion into one port among a plurality of ports of the hosting unit. The transceiving unit receives IP packets and applies a delay to the IP packets. The delay is based on a position of the one port into which the transceiving unit is inserted among the plurality of ports of the hosting unit. The transceiving unit transmits the delayed IP packets to the hosting unit. Alternatively, the hosting unit comprising the plurality of ports (including ports adapted for receiving transceiving units) applies a delay to IP packets received via one port among the plurality of ports. The delay is based on a position of the one port among the plurality of ports. Furthermore, an orchestration method implemented by an orchestration server may be used for determining the delays based on the positions.

27 Claims, 22 Drawing Sheets

STANDARDIZED HOT-PLUGGABLE TRANSCEIVING UNIT, HOSTING UNIT AND METHOD FOR APPLYING DELAYS BASED ON PORT POSITIONS

TECHNICAL FIELD

The present disclosure relates to the field of standardized hot-pluggable transceiving units. More specifically, the present disclosure relates to a standardized hot-pluggable transceiving unit, a hosting unit and a method for applying delays based on port positions.

BACKGROUND

Small Form-factor Pluggable (SFP) units represent one example of standardized hot-pluggable transceiving units. SFP units are standardized units adapted to be inserted within a chassis of a hosting unit. A suite of specifications, produced by the SFF (Small Form Factor) Committee, describe the size of the SFP unit, so as to ensure that all SFP compliant units may be inserted smoothly within one same chassis, i.e. inside cages, ganged cages, superposed cages and belly-to-belly cages. Specifications for SFP units are available at the SFF Committee website.

SFP units may be used with various types of exterior connectors, such as coaxial connectors, optical connectors, RJ45 connectors and various other types of electrical connectors. In general, an SFP unit allows connection between an external apparatus, via a front connector of one of the aforementioned types, and internal components of a hosting unit, for example a motherboard, a card or a backplane leading to further components, via a back interface of the SFP unit. Specification no INF-8074i Rev 1.0, entitled "SFP (Small Form-factor Pluggable) Transceiver, dated May 12, 2001, generally describes sizes, mechanical interfaces, electrical interfaces and identification of SFP units.

The SFF Committee also produced specification no SFF-8431 Rev. 4.1, "Enhanced Small Form-factor Pluggable Module SFP+", dated Jul. 6, 2010. This document, which reflects an evolution of the INF-8074i specification, defines, inter alia, high speed electrical interface specifications for 10 Gigabit per second SFP+ modules and hosts, and testing procedures. The term "SFP+" designates an evolution of SFP specifications.

INF-8074i and SFF-8431 do not generally address internal features and functions of SFP devices. In terms of internal features, they simply define identification information to describe SFP devices' capabilities, supported interfaces, manufacturer, and the like. As a result, conventional SFP devices merely provide connection means between external apparatuses and components of a hosting unit, the hosting unit in turn exchanging signals with external apparatuses via SFP devices.

Recently, SFP units with internal features and functions providing signal processing capabilities have appeared. For instance, some SFP units now include signal re-clocking, signal reshaping or reconditioning, signals combination or separation, signal monitoring, etc.

In the field of video transport, advances have been made recently for transporting the payload of a video signal into Internet Protocol (IP) packets (e.g. Serial Digital Interface (SDI) video payloads encapsulated into IP packets). Furthermore, an SFP unit can be adapted to receive the IP flows transporting the video payloads from a downstream equipment, and to transmit the IP flows to a hosting unit (e.g. a switch or a router) with or without processing the video payloads of the IP flows. The switch or router further forwards the IP flows to an upstream equipment.

One issue with the transport of video IP flows on an IP networking infrastructure is that video IP flows generally require a subsequent amount of bandwidth (which can lead to network congestion) and are very sensitive to delays. The currently deployed IP based video distribution infrastructures do not always make usage of the available bandwidth in an optimized manner.

For instance, a switch (or a router) receives a plurality of video IP flows simultaneously from a plurality of input ports, where some of the input ports are adapted for insertion of an SFP unit. The router forwards the video IP flows received from the plurality of input ports to an upstream link via an output port. Due to internal processing of the received IP flows by the switch, the switch is not capable of operating at a full capacity of the upstream link. The switch is only capable of operating at a maximum capacity representing a percentage (e.g. roughly 80%) of the full capacity of the upstream link. For example, the full capacity of the upstream link is 40 Gigabits per second. The switch is only capable of forwarding the received IP flows to the upstream link via its output port at a maximal rate of roughly 32 Gigabits per second. Therefore, there is a need for new techniques allowing a better usage of the capacity of the upstream link.

More specifically, there is a need for a standardized hot-pluggable transceiving unit, a hosting unit and a method for applying delays based on port positions, in order to improve the forwarding capacity of the hosting unit.

SUMMARY

According to a first aspect, the present disclosure provides a transceiving unit. The transceiving unit comprises a housing adapted to being inserted into a port of a hosting unit. The hosting unit comprises a plurality of ports. The transceiving unit comprises at least one connector located on a front panel of the housing for receiving Internet Protocol (IP) packets. The transceiving unit comprises a processing unit in the housing for applying a delay to the IP packets. The delay is based on a position of the port into which the housing is inserted among the plurality of ports of the hosting unit. The transceiving unit comprises a rear connector located on a back panel of the housing for transmitting the delayed IP packets to the hosting unit.

According to a second aspect, the present disclosure provides a hosting unit. The hosting unit comprises a plurality of ports for receiving Internet Protocol (IP) packets. The hosting unit comprises a processing unit for applying a delay to the IP packets received via one port among the plurality of ports. The delay is based on a position of the one port among the plurality of ports.

According to a particular configuration, at least some among the plurality of ports of the hosting unit are adapted for receiving transceiving units. The transceiving units comprise a housing having standardized dimensions and the housing is adapted for insertion into the at least some among the plurality of ports.

According to another particular configuration, at least some among the transceiving units are standardized hot-pluggable transceiving units comprising a housing having standardized dimensions (for example, SFP units).

According to a third aspect, the present disclosure provides a method for determining delays based on port positions. The method comprises receiving, by a processing unit of an orchestration server via a communication interface of the orchestration server, a discovery message from a transceiving unit inserted into a port of a hosting hosting unit. The hosting unit comprises a plurality of ports. The discovery message comprises a position of the port into which the transceiving unit is inserted among the plurality of ports of the hosting unit. The method comprises determining, by the processing unit of the orchestration server, a delay based on the position of the port into which the transceiving unit is inserted among the plurality of ports of the hosting unit. The method comprises transmitting, by the processing unit of the orchestration server via the communication interface of the orchestration server, a discovery response message to the transceiving unit. The discovery response message comprises the determined delay.

BRIEF DESCRIPTION OF THE DRAWINGS

Embodiments of the disclosure will be described by way of example only with reference to the accompanying drawings, in which.

DETAILED DESCRIPTION

Figure 1:
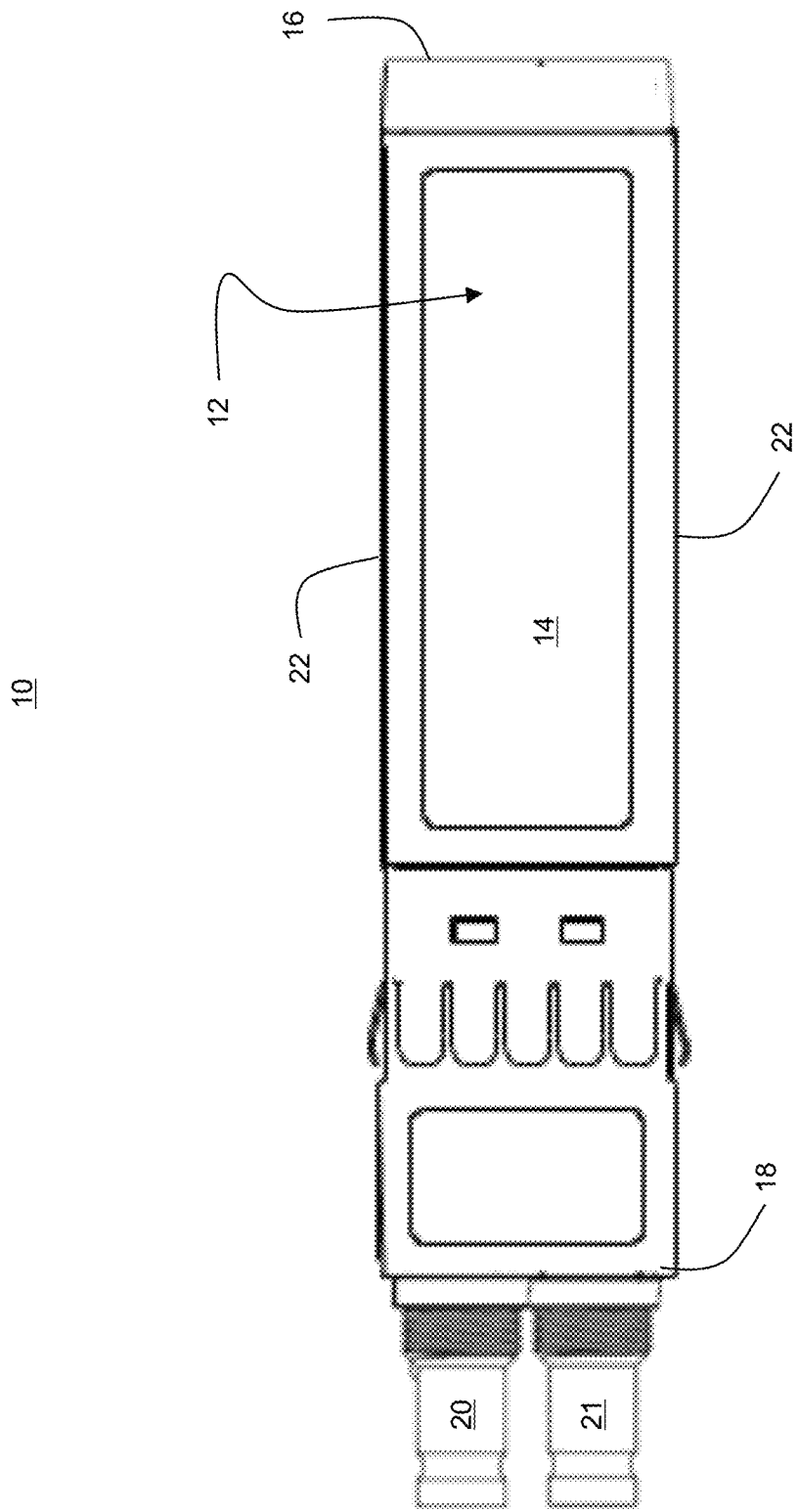
FIG. 1 is a top view of an SFP unit.
Figure 2:
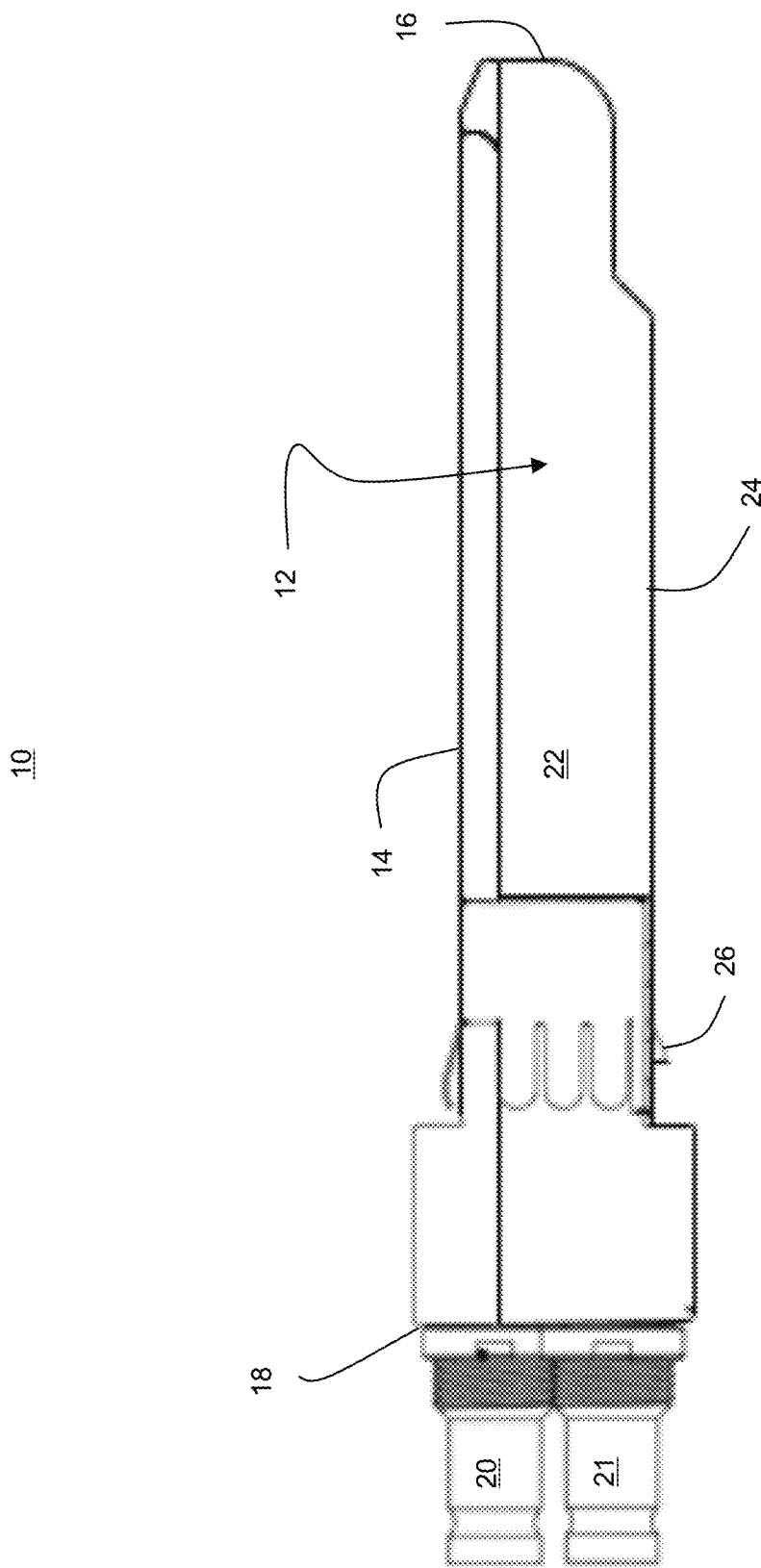
FIG. 2 is a side elevation view of the SFP unit of FIG. 1.
Figure 4:
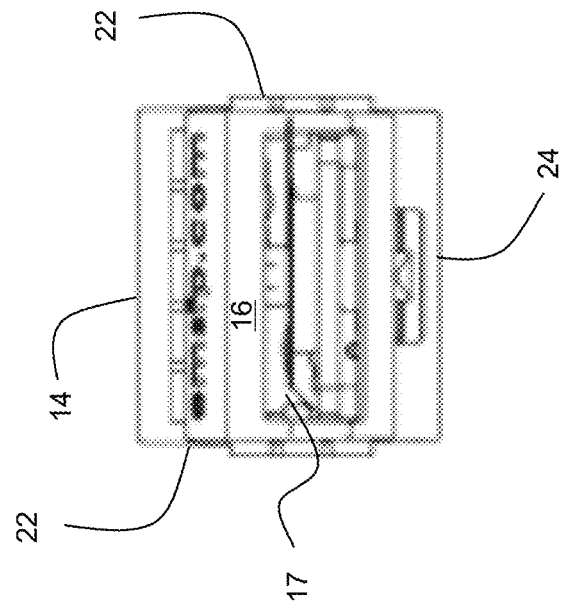
FIG. 4 is back elevation view of the SFP unit of FIG. 1.
Figure 3:
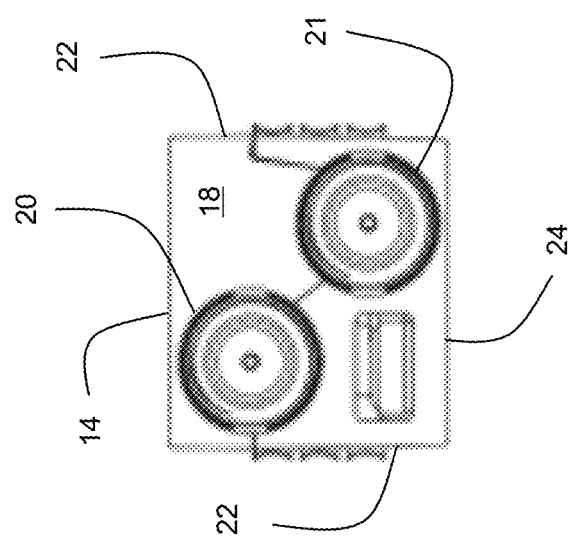
FIG. 3 is a front elevation view of the SFP unit of FIG. 1.
Figure 5:
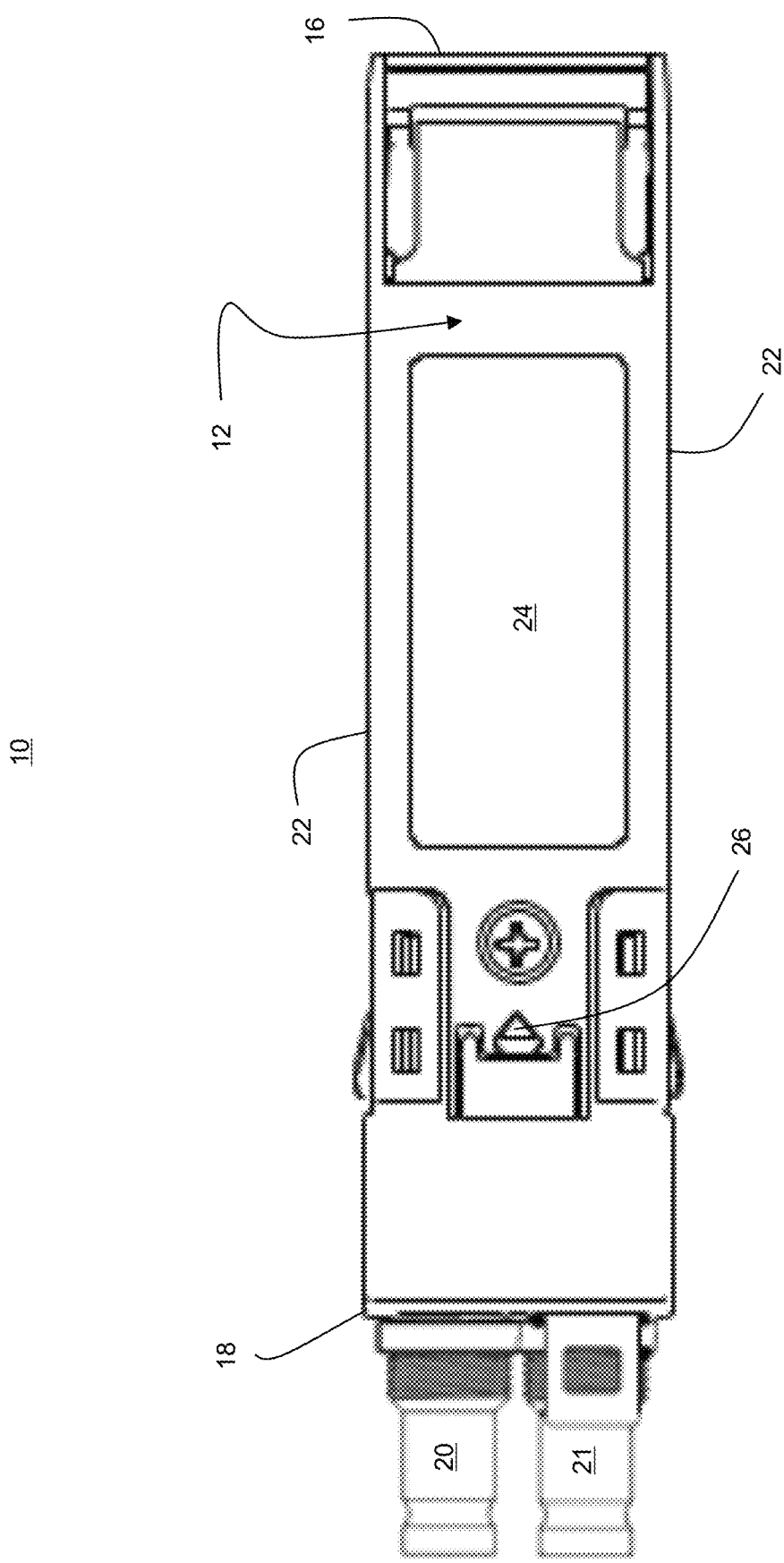
FIG. 5 is a bottom view of the SFP unit of FIG. 1.
Figure 6:
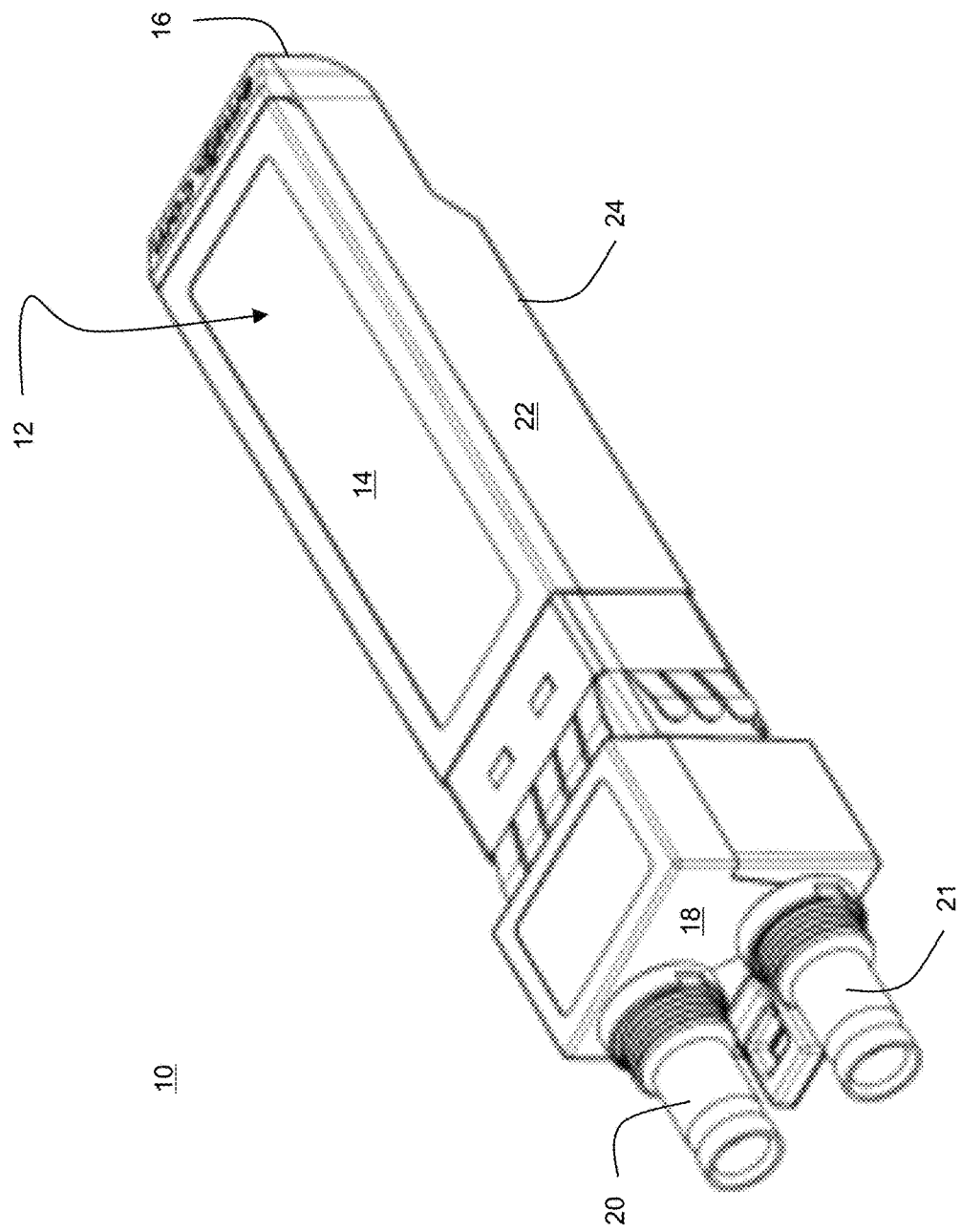
FIG. 6 is a perspective view of the SFP unit of FIG. 1.

The foregoing and other features will become more apparent upon reading of the following non-restrictive description of illustrative embodiments thereof, given by way of example only with reference to the accompanying drawings.

The present disclosure describes standardized hot-pluggable transceiving units, such as Small Form-factor Pluggable (SFP)/SFP+ units, having internal features that far exceed those of conventional units. Conventional units merely provide connection capabilities between a hosting unit in which they are inserted and external apparatuses. The standardized hot-pluggable transceiving unit disclosed herein provides the capability of applying a delay based on a position of a port of a hosting unit into which the transceiving unit is inserted. In an alternative implementation, the delay is applied by the hosting unit in place of the transceiving unit. In still an alternative implementation, the delay is determined at an orchestration server managing a plurality of transceiving units.

The following terminology is used throughout the present disclosure:

SFP: Small Form-factor Pluggable, this term refers to units that are insertable into a chassis of a hosting unit; in the present disclosure, an SFP unit complies with an industry standard specification.

Connector: A device component for physically joining circuits carrying electrical, optical, radio-frequency, or like signals.

Standardized Hot-Pluggable Transceiving Unit with Conventional Capabilities

In the rest of the disclosure, an SFP unit is used to illustrate an example of a standardized hot-pluggable transceiving unit. However, the teachings of the present disclosure are not limited to an SFP unit; but can be applied to any type of standardized hot-pluggable transceiving unit.

An SFP unit comprises a housing having a front panel, a back panel, a top, a bottom and two sides. Generally, the front panel includes at least one connector for connecting a cable, a fiber, twisted pairs, etc. The back panel includes at least one rear connector for connecting to a hosting unit. However, some SFP units may have no front connector, or alternatively no rear connector. The SFP unit may be fully-compliant or partially compliant with standardized SFP dimensions, such as SFP, SFP+, XFP (SFP with 10 Gigabit/s data rate), Xenpak, QSFP (Quad (4-channel) SFP with 4×10 Gigabit/s data rate), QSFP+, CFP (C form-factor pluggable with 100 Gigabit/s data rate), CPAK or any other standardized Small Form-factor Pluggable unit.

Reference is now made concurrently to FIGS. 1-6, which are, respectively, a top view, a side elevation view, a front elevation view, a back elevation view, a bottom view and a perspective view of an SFP unit 10. The SFP unit 10 comprises a housing 12. The housing 12 defines a top 14, a bottom 24, and two sides 22. The housing 12 is at least partially of dimensions in compliance with at least one of the following standards: SFP, SFP+, XFP, Xenpak, QSFP, QSFP+, CFP, CPAK, etc. Alternatively, the housing 12 has functional dimensions based on at least one of the following standards: SFP, SFP+, XFP, Xenpak, QSFP, QSFP+, CFP, CPAK, etc.

The SFP unit 10 further comprises a back panel 16 affixed to the housing 12. The back panel 16 comprises a rear connector 17, for instance an electrical or an optical connector. In an example, the back panel 16 comprises the rear connector 17 (also named a host connector) suitable to connect the SFP unit 10 to a backplane of a chassis (not shown for clarity purposes) of a hosting unit, as known to those skilled in the art. More specifically, the connection is performed via a port of the hosting unit adapted for insertion of the SFP unit 10 and connection of the rear connector 17 to the backplane of the hosting unit.

The SFP unit 10 further comprises a front panel 18 affixed to the housing 12. The front panel 18 comprises one or more connectors, for example a connector 20 of a co-axial cable type, adapted to send and/or receive video IP flows and a connector 21, also of the co-axial cable type, also adapted to send and/or receive video IP flows. The SFP unit 10 further comprises an engagement mechanism, such as for example a latch 26 as shown in a resting position on the bottom 24 in FIG. 2, for maintaining the SFP unit 10 in place within a chassis.

SFP Unit Implementing a Delay Functionality

Referring now concurrently to FIGS. 7, 8A, 8B and 9A, an SFP unit 100 (FIGS. 7, 8A and 8B) and a hosting unit 200 (FIGS. 8A, 8B and 9A) are represented. The SFP unit 100 is adapted for being inserted into a port of the hosting unit 200. The SFP unit 100 corresponds to the SFP unit 10 represented in FIGS. 1 to 6, and comprises the housing 12, the back panel 16 and the front panel 18.

The SFP unit 100 comprises at least one front connector 20 located on the front panel 18 for receiving one or more signal, each signal transporting one or more IP flow 101.

An IP flow is well known in the art. It consists of a sequence of IP packets from a source (e.g. a video source generating a video IP flow) to a destination (e.g. a video receiver displaying videos based on the video IP flow). Several protocol layers are involved in the transport of the IP packets of the IP flow 101, including a physical layer (e.g. optical or electrical), a link layer (e.g. Media Access Control (MAC) for Ethernet), a network layer (e.g. IPv4 or IPv6), a transport layer (e.g. User Datagram Protocol (UDP)), and one or more application layers ultimately embedding an application payload (e.g. at least one of a video payload, an audio payload and a metadata payload). The IP flow provides end-to-end delivery of the application payload over an IP networking infrastructure.

The front connector 20 receives a plurality of IP packets, the plurality of IP packets corresponding to a single IP flow 101 or a plurality of IP flows 101. Optionally, the SFP unit 100 comprises more than one front connector for receiving the IP flows 101. For example, the SFP unit 100 comprises a second front connector 21. The second front connector 21 also receives a plurality of IP packets, the plurality of IP packets corresponding to a single IP flow 101 or a plurality of IP flows 101.

The SFP unit 100 comprises a processing unit 110 in the housing 12 implementing a delay functionality 112. The delay functionality 112 is implemented by a software executed by the processing unit 110. Alternatively, the delay functionality 112 is implemented by dedicated hardware component(s) of the processing unit 110 (e.g. one or several Field-Programmable Gate Array (FPGA)). The delay functionality 112 applies a delay to the IP packets of the IP flow(s) 101, to generate delayed IP flow(s) 102. Each delayed IP flow 102 is outputted by a rear connector 17 located on the back panel 16 of the SFP unit 100.

The SFP unit 100 is inserted into a port of the hosting unit 200. As mentioned previously, the hosting unit 200 may consist of an IP switch, a router, a gateway, a server, etc. For illustration purposes, the hosting unit 200 will also be referred to as an IP switch in the rest of the description. As illustrated in FIG. 9A, the hosting unit 200 comprises a plurality of ports 230 adapted for respectively receiving SFP units 100. In the rest of the description, a port adapted to receive an SFP unit will be referred to as an SFP port. The hosting unit 200 may comprise additional communication interfaces 220 not adapted for receiving SFP units 100 (e.g. Ethernet ports 220). The SFP ports 230 are not represented in FIG. 8A for simplification purposes. FIG. 8B is a schematic representation of two SFP units 100 inserted into two corresponding SFP ports 230. Only two SFP units 100 and two corresponding SFP ports 230 have been represented in FIG. 8B for simplification purposes.

The hosting unit 200 also comprises a processing unit 210 implementing a networking functionality 212 (e.g. switching and/or routing). The processing unit 210 receives data packets through various networking interfaces of the hosting unit 200, and the networking functionality 212 processes the received data packets to forward these data packets through one of the interfaces of the hosting unit 200, as is well known in the art. For instance, each delayed IP flow 102 outputted by the rear connector 17 of one of the SFP units 100 is transmitted to the processing unit 210 of the hosting unit 200 via one of the SFP ports 230 of the hosting unit 200, as illustrated in FIG. 8B. The delayed IP flows 102 are processed by the networking functionality 212 and forwarded via one of the communication interfaces of the hosting unit 200 (e.g. Ethernet port 220).

Figure 8A:
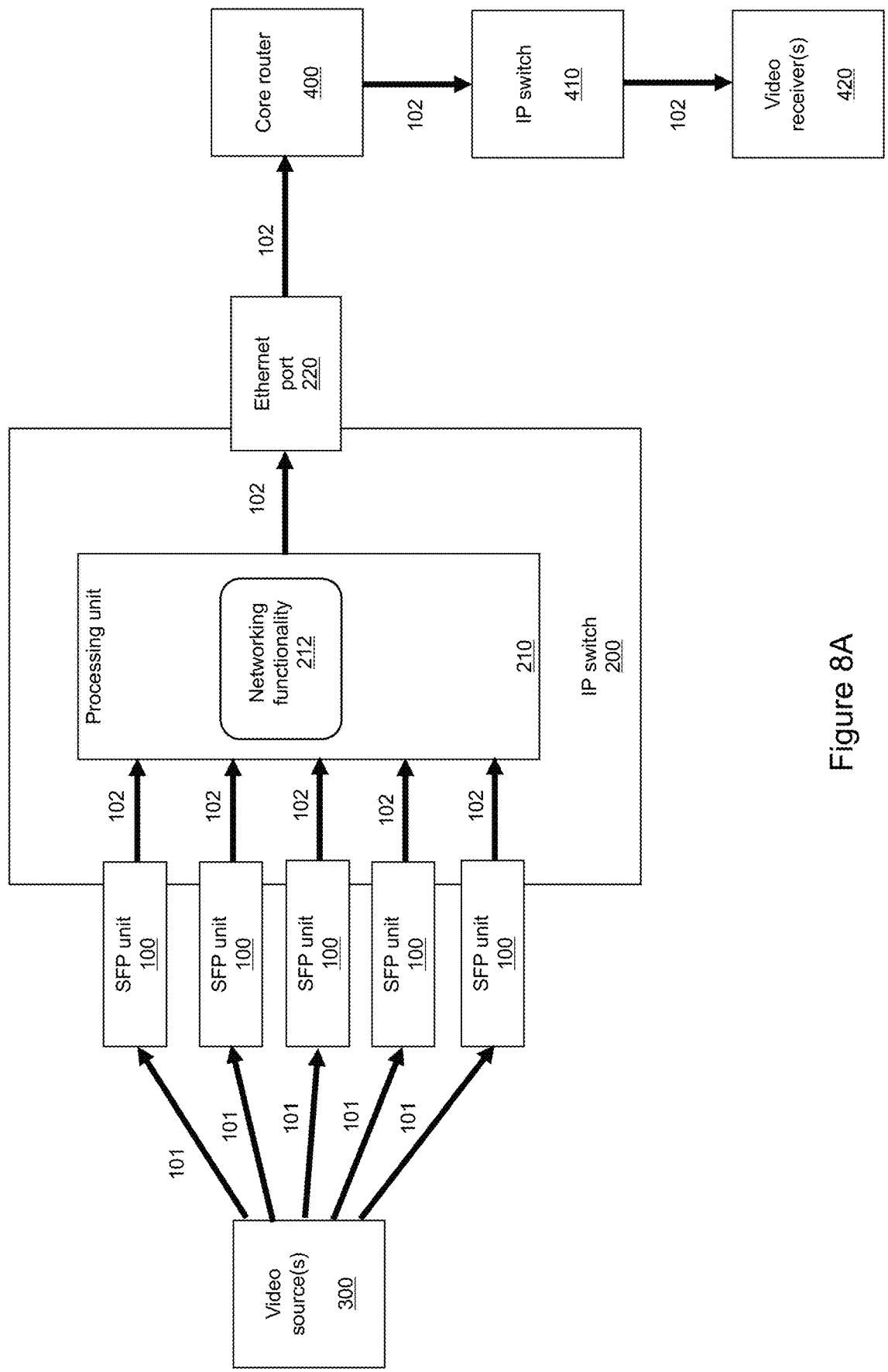
FIGS. 8A and 8B represent a hosting unit comprising a plurality of ports for inserting SFP units represented in FIG. 7.
Figure 8B:
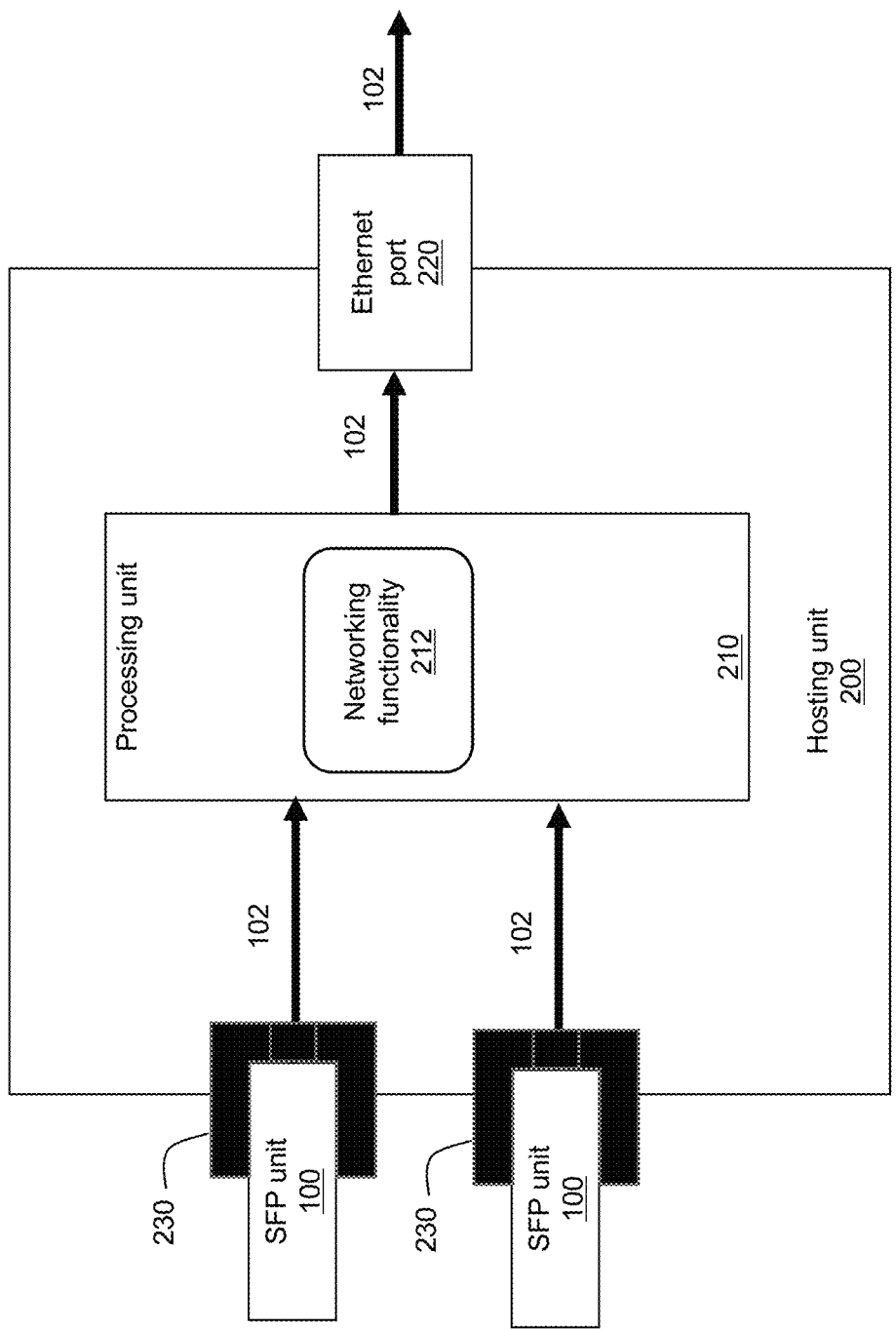
Figure 9A:
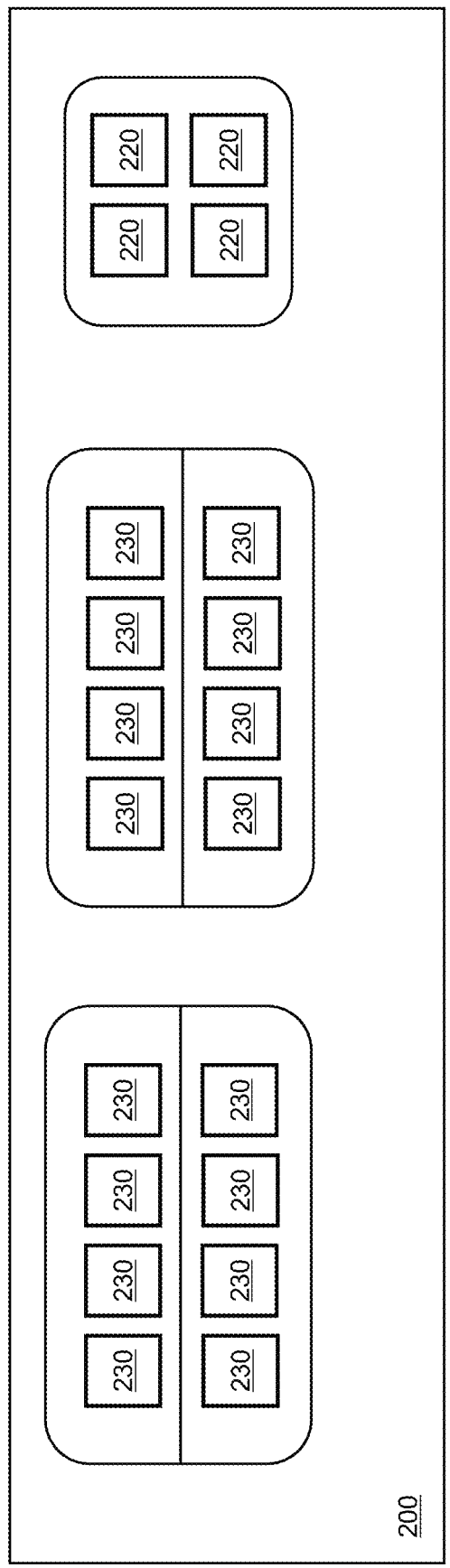
FIG. 9A represents a detailed layout of the ports of the hosting unit of FIG. 8A.

FIG. 8A represents an end-to-end transmission of IP flows consisting of video IP flows for illustration purposes. One or more video source 300 (e.g. a professional video recorder for the film industry, a security camera, a television broadcasting equipment, etc.) generates a plurality of video IP flows 101. The plurality of video IP flows 101 are received by the plurality of SFP units 100 and delayed into a corresponding plurality of delayed video IP flows 102. The plurality of delayed video IP flows 102 are transmitted to the IP switch 200, processed by the IP switch 200 and forwarded to a core router 400. The core router 400 routes the video IP flows 102 to an IP switch 410. The IP switch 410 forwards the video IP flows 102 to one or more video receiver 420 for further processing of the video IP flows 102 (e.g. displaying the videos transported by the video IP flows 102).

Referring now concurrently to FIGS. 7, 9A, 9B and 9C, the determination of the delay applied by the delay functionality 112 of the SFP unit 100 is illustrated. The delay applied by the delay functionality 112 is based on a position of the SFP port 230, into which the SFP unit 100 is inserted, among the plurality of SFP ports 230 of the hosting unit 200.

Figure 9B:
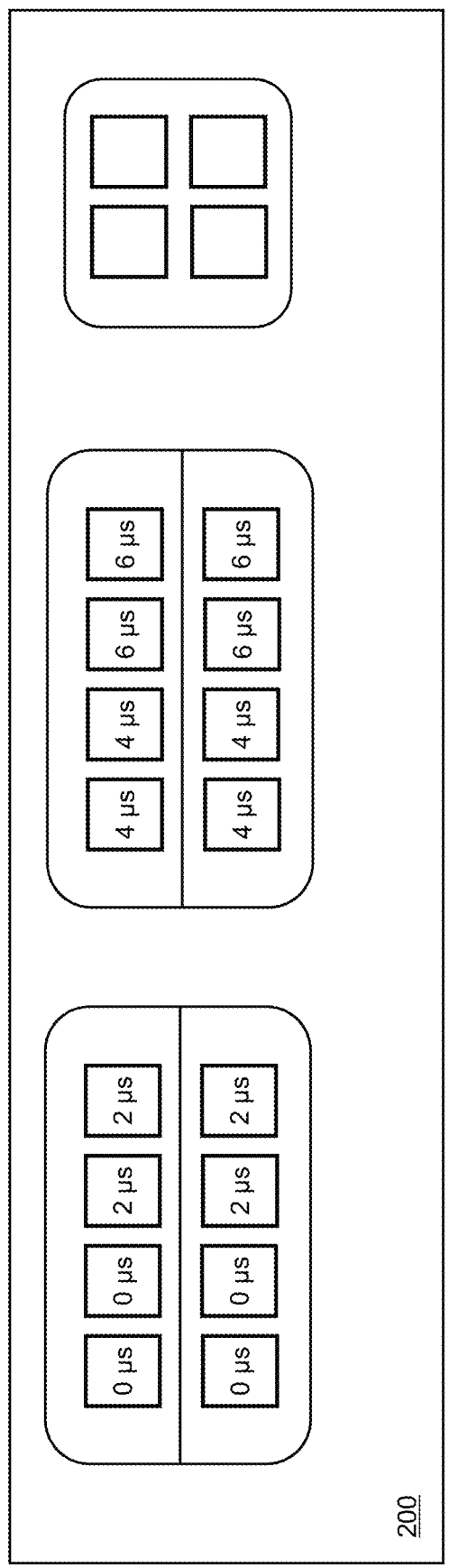
FIGS. 9B and 9C represent exemplary delays based on the positions of the ports of the hosting unit of FIG. 9A.
Figure 9C:
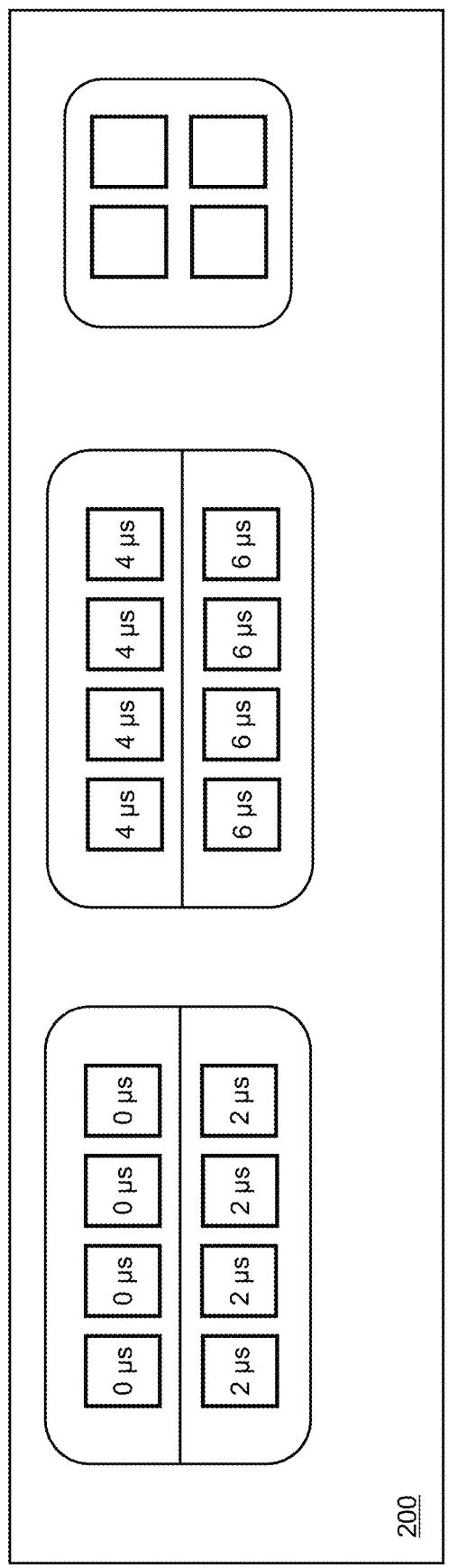

The SFP ports 230 of the hosting unit 200 are grouped into a plurality of groups (at least two) of SFP ports 230. Each group comprises one or more SFP port 230. Each SFP port 230 belonging to one of the groups is allocated the same delay, which is different from the delays allocated to the other groups. FIG. 9B illustrates an exemplary implementation, where a first group of 4 SFP ports 230 is allocated a delay of 0 micro-second (µs), a second group of 4 SFP ports 230 is allocated a delay of 2 µs, a third group of 4 SFP ports 230 is allocated a delay of 4 µs, and a fourth group of 4 SFP ports 230 is allocated a delay of 6 µs. FIG. 9C illustrates another exemplary implementation, where the four groups of SFP ports are distributed differently. At least one of the groups of SFP ports 230 may include a different number of SFP ports 230 than the other groups.

As mentioned previously and referring to FIG. 8A, the objective is to reduce the bottlenecks in the processing by the networking functionality 212 (of the hosting unit 200) of the IP flows 102 received from the SFP units 100. By introducing port dependent delays in the IP flows 102 outputted by the SFP units 100, the processing by the networking functionality 212 of the IP flows 102 is smoothed to avoid the bottlenecks, which leads to a more optimal usage of the output bandwidth (e.g. the output bandwidth of the Ethernet port 220) of the IP switch 200. Without the present delay mechanism, when a bottleneck occurs, only a limited amount of the output bandwidth is used (e.g. between 0 and 40%). Thus, without the present delay mechanism, the average output bandwidth only reaches 80% of the maximum output bandwidth. By contrast, with the present delay mechanism, the average output bandwidth may reach 90% or even 95% of the maximum output value.

The number of groups, the number of SFP units 230 for each group, and the delay allocated to each group are determined experimentally. For example, referring to the hosting unit 200 represented in FIG. 9A which comprises 16 SFP ports 230, the following configurations could be tested. Two groups of 8 SFP ports, with respective delays of 0 and 8 μs. Four groups of 4 SFP ports, with respective delays of 0, 2, 4 and 6 μs. Eight groups of 2 SFP ports, with respective delays of 0, 1, 2, 3, 4, 5, 6 and 7 μs. These configurations are for illustration purposes only.

In a first implementation, each SFP unit 100 is configured with a mapping between the positions and the corresponding delays. When a given SFP unit 100 is inserted into a given SFP port 230 of the hosting unit 200, the position of the given SFP port 230 is transmitted by the hosting unit 200 to the given SFP unit 100. Based on the transmitted position, the corresponding delay is selected using the configured mapping. The delay functionality 112 applies the selected delay to the IP packets of the received IP flow(s) 101 to generate the delayed IP flow(s) 102. As is well known in the art, applying a given delay to IP packets can be implemented through one or more queues having configurable delays.

The configuration of the SFP unit 100 with the mapping between the positions and the corresponding delays is performed via a configuration message transmitted to the SFP unit 100. The configuration message is transmitted by the hosting unit 200 or by another computing device not represented in the Figures. For example, the configuration message is generated based on interactions with a user, the user providing the mapping between the positions and the corresponding delays. The mapping between the positions and the corresponding delays is stored in a memory 120 of the SFP unit 100.

The position of the SFP port 230 receiving the SFP unit 100 may be represented in different manners. Referring to FIG. 9A, the hosting unit 200 comprises 16 SFP ports 230. Each SFP port 230 is allocated a unique integer value between 0 and 15 (or 1 and 16), which is used as its position. The hosting unit 200 represented in FIG. 9A comprises 2 sub-panels of 8 SFP ports each. Each sub-panel comprises an upper line and a lower line, each line comprising 4 SFP ports. Thus, in an alternative representation, each SFP port 230 is identified by the triplet sub-panel, line and position in the line. For example, the left sub-panel is allocated the value 0 and the right sub-panel is allocated the value 1. The upper line is allocated the value 0 and the lower line is allocated the value 1. Within a line, the SFP ports are allocated the values 0 to 3 from the left to the right of the line. With this encoding scheme, the position of the upper left SFP port is encoded as follows: 0,0,0; the position of the lower right SFP port is encoded as follows: 1,1,3; etc. Referring to FIG. 9C, the mapping table is as follows: delay of 0 μs for positions 0,0,[0 . . . 4]; delay of 2 μs for positions 0,1,[0 . . . 4]; delay of 4 μs for positions 1,0,[0 . . . 4]; delay of 6 μs for position 1,1,[0 . . . 4].

The Link Layer Discovery Protocol (LLDP) specified in Institute of Electrical and Electronics Engineers (IEEE) 802.1AB and IEEE 802.3-2012 section 6 clause 79 can be used for transmitting the position of the SFP port 230 into which the SFP unit 100 is inserted. An LLDP frame is generated and transmitted by the hosting unit 200 (via the SFP port 230) to the SFP unit 100 (via the rear connector 17). An LLDP frame comprises mandatory Type-Length-Values (TLVs) and zero or more optional TLV. The "Port ID" mandatory TLV is used for transmitting the position of the SFP port 230. Alternatively, an optional TLV is used for transmitting the position of the SFP port 230 (if the format used for encoding the position of the SFP port 230 is different from the format used for the "Port ID" mandatory TLV).

Alternatively, another standardized protocol or a proprietary protocol can be used for transmitting the position of the SFP port 230. For example, a request message is transmitted by the SFP unit 100 to the hosting unit 200. Upon reception of the request message, the hosting unit 200 transmits a response message to the SFP unit 100, the response message comprising the position of the SFP port 230 into which the SFP unit 100 is inserted.

In still an alternative implementation, the mapping between the positions and the corresponding delays is stored in the hosting unit 200. Upon insertion of the SFP unit 100 into one of the SFP ports 230, the hosting unit 200 determines the position of the SFP port 230 into which the SFP unit 100 is inserted among the plurality of SFP ports 230. Having the position, the hosting unit 200 selects the corresponding delay using the mapping between the positions and the corresponding delays. The selected delay is transmitted to the SFP unit 100 by the hosting unit 200. The transmitted delay is directly used by the delay functionality 112 for applying the transmitted delay to the IP packets of the received IP flow(s) 101. As mentioned previously, the transmission of the selected delay can use the LLDP protocol, another standardized protocol, or a proprietary protocol.

Although the hosting unit 200 has been represented with a networking functionality 212 for processing the delayed IP flows 102, other types of functionalities may be implemented (alternatively to or in addition to the networking functionality 212) by the hosting unit 200 for processing the delayed IP flows 102.

Figure 10:
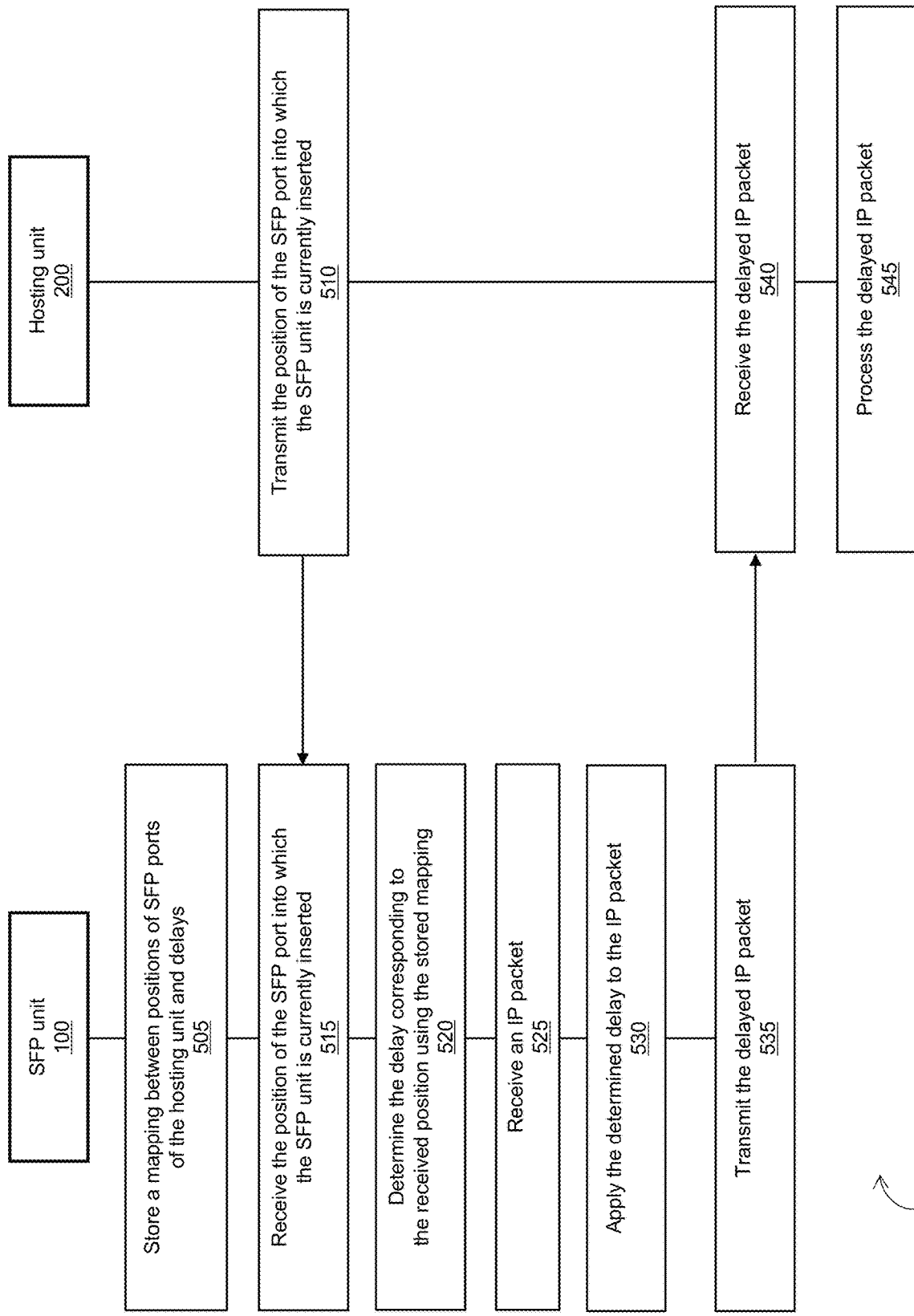
FIG. 10 represents a method for applying a delay by a SFP unit based on a position of a port for inserting the SFP unit.

Referring now concurrently to FIGS. 7, 8A, 8B and 10, a method 500 for applying delays based on port positions is represented in FIG. 10.

A dedicated computer program has instructions for implementing the steps of the method 500 executed by the processing unit 110 of the SFP unit 100. The instructions are comprised in a non-transitory computer program product (e.g. the memory 120) of the SFP unit 100. The instructions, when executed by the processing unit 110 of the SFP unit 100, provide for applying delays based on port positions. The instructions are deliverable to the SFP unit 100 via a communication network through one of the communication interfaces 20, 21 or 17 of the SFP unit 100.

The method 500 comprises the step 505 of storing a mapping between positions of SFP ports of the hosting unit 200 and delays. Step 505 is executed by the processing unit 110 of the SFP unit 100. The transmission of the mapping to the SFP unit 100 has been described previously.

The method 500 comprises the step 510 of transmitting the position of the SFP port 230 (of the hosting unit 200) into which the SFP unit 100 is currently inserted. Step 510 is executed by the processing unit 210 of the hosting unit 200.

The method 500 comprises the step 515 of receiving the position of the SFP port 230 (of the hosting unit 200) into which the SFP unit 100 is currently inserted. Step 515 is executed by the processing unit 110 of the SFP unit 100.

The method 500 comprises the step 520 of determining the delay corresponding to the position received at step 515, using the mapping stored at step 505. Step 520 is executed by the processing unit 110 of the SFP unit 100.

The method 500 comprises the step 525 of receiving an IP packet. Step 525 is executed by the processing unit 110 of the SFP unit 100. As described previously, the IP packet belongs to an IP flow 101 received via the front connector 20 (or optionally to an IP flow 101 received via another front connector 21).

The method 500 comprises the step 530 of applying the delay determined at step 520 to the IP packet received at step 525. Step 530 is executed by the processing unit 110 of the SFP unit 100.

Steps 515, 520 and 530 are performed by the delay functionality 112.

The method 500 comprises the step 535 of transmitting the delayed IP packet to the hosting unit 200. Step 535 is executed by the processing unit 110 of the SFP unit 100. As described previously, the delayed IP packet is transmitted via the rear connector 17 of the SFP unit 100.

The method 500 comprises the step 540 of receiving the delayed IP packet by the hosting unit 200. Step 540 is executed by the processing unit 210 of the hosting unit 200. As described previously, the delayed IP packet is received via the SFP port 230 (into which the SFP unit 200 is inserted) of the hosting unit 200.

The method 500 comprises the step 545 of processing the delayed IP packet. Step 545 is executed by the processing unit 210 of the hosting unit 200. As described previously, the processing of the delayed IP packet is performed by the networking functionality 212 executed by the processing unit 210.

Steps 525, 530, 535, 540 and 545 are repeated for each IP packet belonging to an IP flow 101 received by the SFP unit 100.

If the SFP unit 100 is inserted into a different SFP port 230 of the hosting unit 200, steps 515 and 520 are repeated.

The present disclosure is not limited to SFP units or standardized hot-pluggable transceiving units comprising a housing with standardized dimensions. The present disclosure also applies to any transceiving unit 100 adapted to being inserted into a corresponding port 230 of the hosting unit 200. The only constraint is that the transceiving unit 100 and the corresponding insertion port 230 of the hosting unit 200 have compatible characteristics (e.g. in terms of shape, electrical interfaces, etc.).

Hosting Unit Implementing the Delay Functionality

Figure 7:
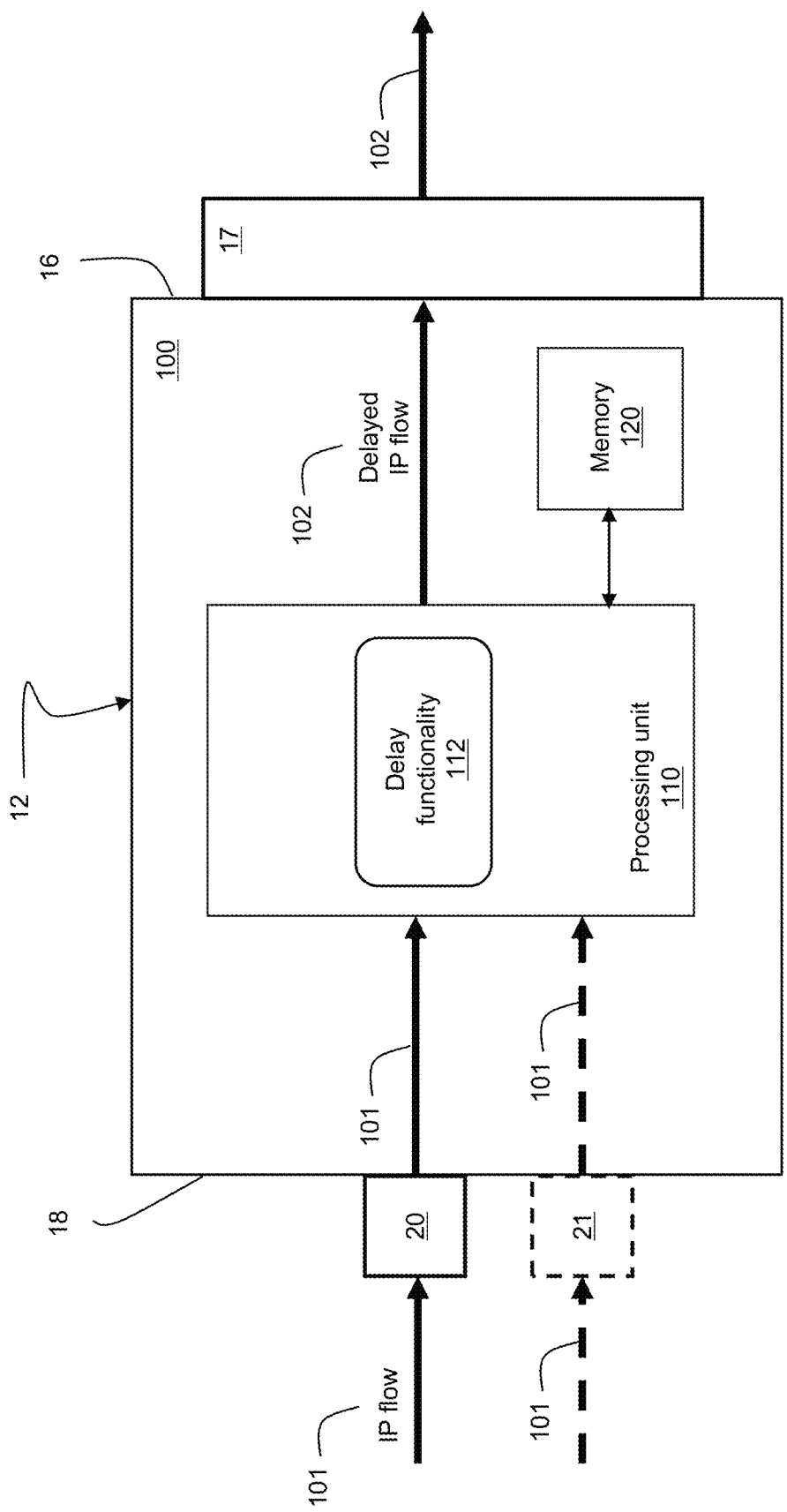
FIG. 7 represents a SFP unit applying a delay based on a position of a port for inserting the SFP unit.
Figure 11:
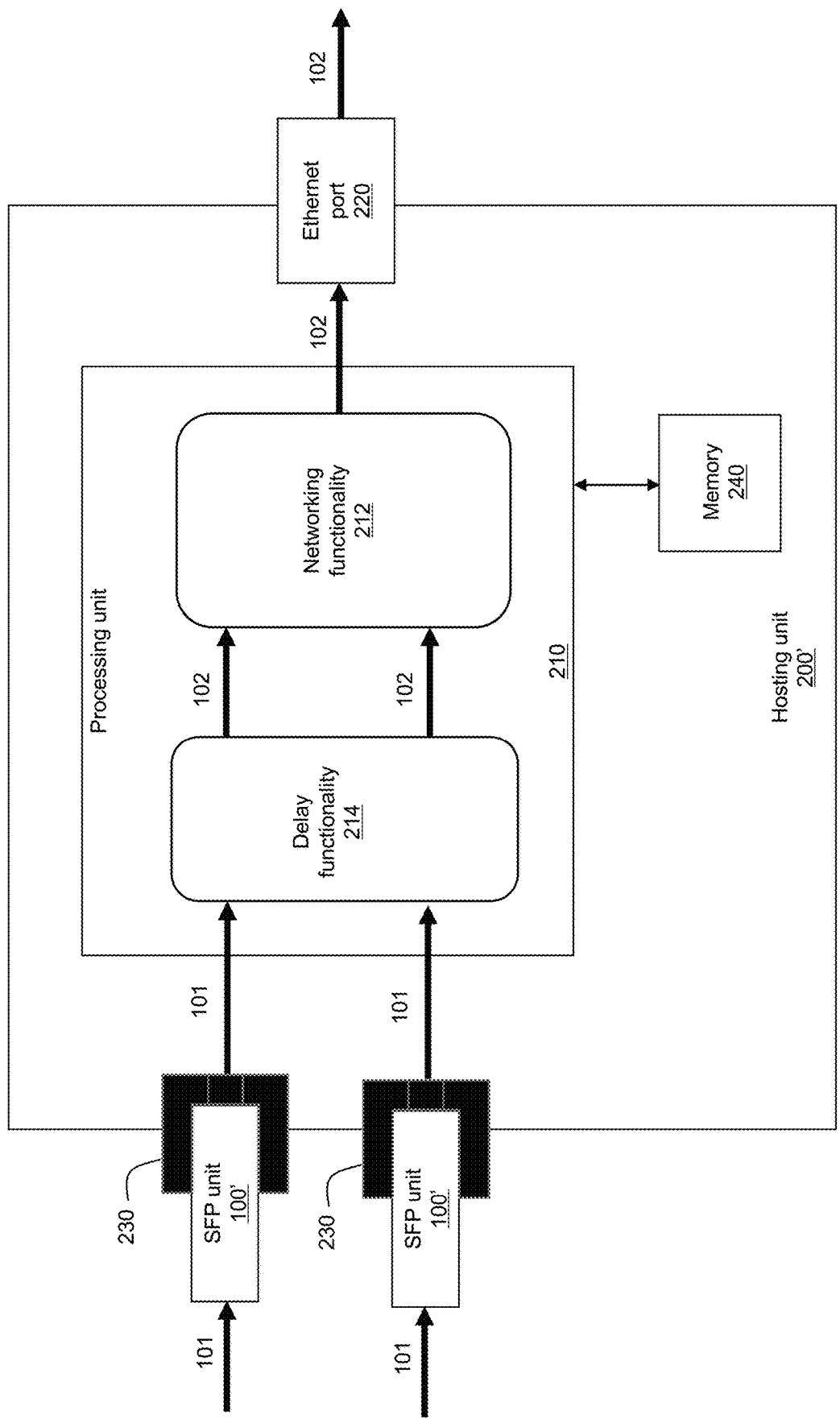
FIG. 11 represents a hosting unit applying a delay based on a position of a port for inserting a SFP unit.

Referring now concurrently to FIGS. 7 and 11, a hosting unit 200' implementing a delay functionality 214 is represented in FIG. 11. The delay functionality 214 implemented by the hosting unit 200' corresponds to the delay functionality 112 implemented by the SFP unit 100 of FIG. 7.

The SFP units 100' inserted into the SFP ports 230 of the hosting unit 200' do not implement the delay functionality 112. The IP flows 101 received by the SFP unit 100' are transmitted to the hosting unit 200' without applying a delay.

The delay functionality 214 is implemented by a software executed by the processing unit 210. Alternatively, the delay functionality 214 is implemented by dedicated hardware component(s) of the processing unit 210 (e.g. one or several Field-Programmable Gate Array (FPGA)). The delay functionality 214 applies a delay to the IP packets of the IP flows 101 received from the SFP units 100', to generate delayed IP flows 102. Each delayed IP flow 102 is further processed by the networking functionality 212, before being forwarded through one of the interfaces of the hosting unit 200' (e.g. the Ethernet port 220), as is well known in the art.

Although the hosting unit 200' has been represented with a networking functionality 212 for processing the delayed IP packets of the delayed IP flows 102, other types of functionalities may be implemented (alternatively to or in addition to the networking functionality 212) by the hosting unit 200' for processing the delayed IP flows 102.

The determination of the delay applied by the delay functionality 214 of the hosting unit 200' is similar to the determination of the delay applied by the delay functionality 112 of the SFP unit 100. The delay applied by the delay functionality 214 to an IP packet of an IP flow 101 received via a given SFP port 230 is based on a position of the given SFP port 230 among the plurality of SFP ports 230 of the hosting unit 200'. Only two SFP ports 230 are represented in FIG. 11 for simplification purposes. However, the hosting unit 200' comprises a plurality of SFP ports 230 (e.g. 8, 16, 24, 32, 48, etc.) for receiving the IP flows 101. Each SFP port 230 receives one or more IP flow transmitted by the SFP unit 100' inserted into the SFP port 230.

As mentioned previously, the SFP ports 230 of the hosting unit 200' are grouped into a plurality of groups (at least two) of SFP ports 230. Each group comprises one or more SFP port 230. Each SFP port 230 belonging to one of the groups is allocated the same delay, which is different from the delays allocated to the other groups.

The hosting unit 200' is configured with a mapping between the positions and the corresponding delays. When an IP packet of an IP flow 101 is received via a given SFP port 230, the position of the given SFP port 230 is determined by the hosting unit 200'. Based on the determined position, the corresponding delay is determined using the configured mapping. The delay functionality 214 applies the determined delay to the IP packet of the received IP flow 101.

The configuration of the hosting unit 200' with the mapping between the positions and the corresponding delays is generated based on interactions with a user (via a user interface of the hosting unit 200' not represented in the Figures for simplification purposes). The user provides the mapping between the positions and the corresponding delays. The mapping between the positions and the corresponding delays is stored in a memory 240 of the hosting unit 200'. Alternatively, the mapping is transmitted by a configuration device (not represented in FIG. 11) via a configuration message sent to the hosting unit 200'.

Figure 12:
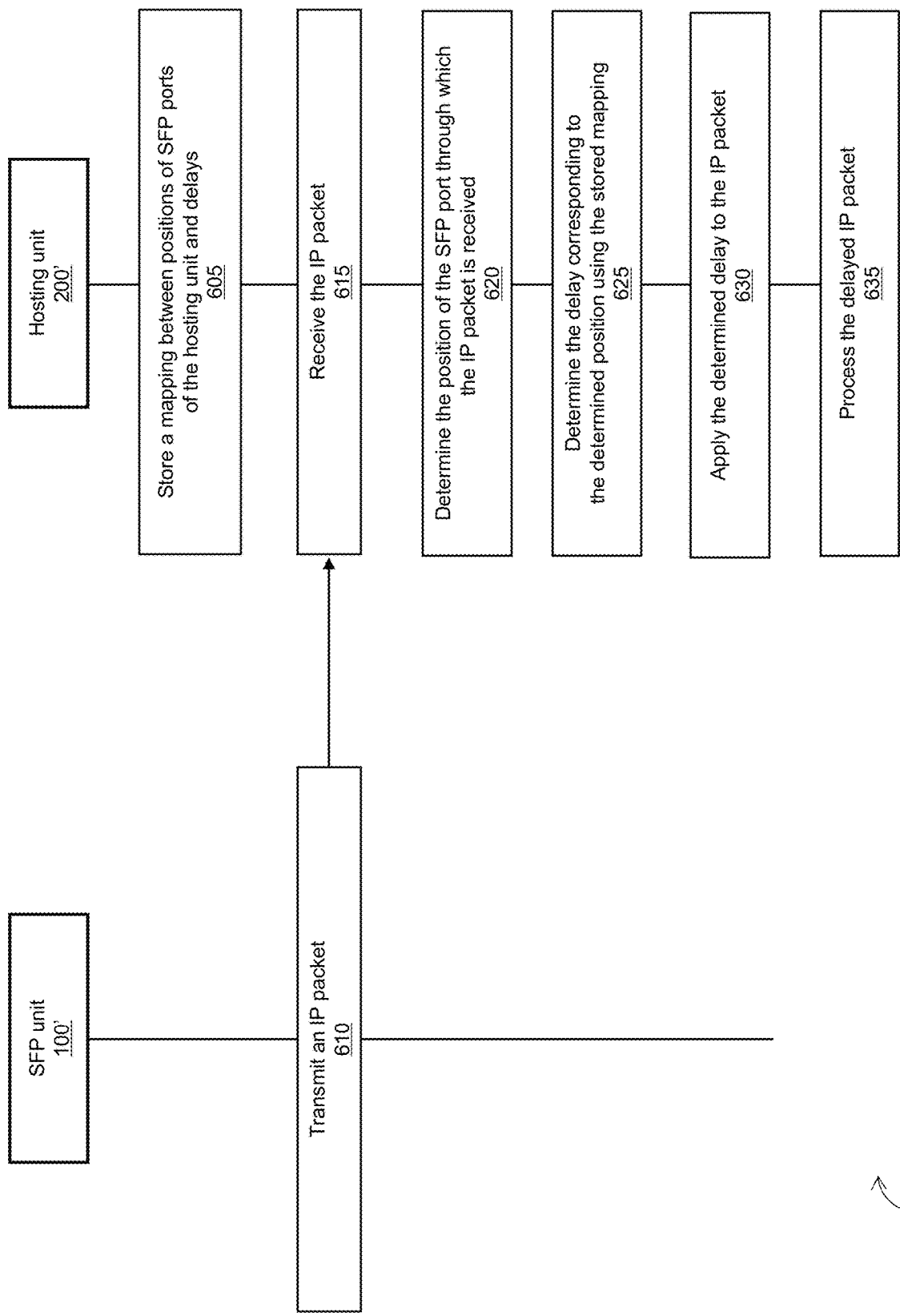
FIG. 12 represents a method for applying a delay by a hosting unit based on a position of a port for inserting a SFP unit.

Referring now concurrently to FIGS. 11 and 12, a method 600 for applying delays based on port positions is represented in FIG. 12.

A dedicated computer program has instructions for implementing the steps of the method 600 executed by the processing unit 210 of the hosting unit 200'. The instructions are comprised in a non-transitory computer program product (e.g. the memory 240) of the hosting unit 200'. The instructions, when executed by the processing unit 210 of the hosting unit 200', provide for applying delays based on port positions. The instructions are deliverable to the hosting unit 200' via an electronically-readable media such as a storage media (e.g. CD-ROM, USB key, etc.), or via communication links (e.g. via a communication network through one of the communication interfaces of the hosting unit 200').

The method 600 comprises the step 605 of storing a mapping between positions of SFP ports of the hosting unit 200' and delays. Step 605 is executed by the processing unit 210 of the hosting unit 200'.

The method 600 comprises the step 610 of transmitting an IP packet. Step 610 is executed by the processing unit 110 of the SFP unit 100'.

The method 600 comprises the step 615 of receiving the IP packet. Step 610 is executed by the processing unit 210 of the hosting unit 200'. As described previously, the IP packet belongs to an IP flow 101 received via one of the SFP ports 230 of the hosting unit 200' (into which the SFP unit 100' is inserted).

The method 600 comprises the step 620 of determining the position of the SFP port 230 through which the IP packet is received at step 615. Step 620 is executed by the processing unit 210 of the hosting unit 200'.

The method 600 comprises the step 625 of determining the delay corresponding to the position determined at step 620, using the mapping stored at step 605. Step 625 is executed by the processing unit 210 of the hosting unit 200'.

The method 600 comprises the step 630 of applying the delay determined at step 625 to the IP packet received at step 615. Step 630 is executed by the processing unit 210 of the hosting unit 200'.

Steps 620, 625 and 630 are performed by the delay functionality 214.

The method 600 comprises the step 635 of processing the delayed IP packet. Step 635 is executed by the processing unit 210 of the hosting unit 200'. As described previously, the processing of the delayed IP packet is performed by the networking functionality 212 executed by the processing unit 210.

Steps 610 to 635 are repeated for each IP packet belonging to an IP flow 101 transmitted by one of the SFP units 100' inserted into one of the SFP ports 230 of the hosting unit 200'.

Furthermore, steps 610 to 635 may be performed in parallel for several different SFP ports 230, the delay determined at step 625 being dependent on the respective positions of each one of the several different SFP ports 230.

As mentioned previously, the present disclosure is not limited to SFP units or standardized hot-pluggable transceiving units comprising a housing with standardized dimensions. The present disclosure also applies to any transceiving unit 100' adapted to being inserted into a corresponding port 230 of the hosting unit 200'. The only constraint is that the transceiving unit 100' and the corresponding insertion port 230 of the hosting unit 200' have compatible characteristics (e.g. in terms of shape, electrical interfaces, etc.).

Furthermore, the present disclosure can be extended to any type of port 230 of the hosting unit 200' through which an incoming IP flow 101 is received. As described previously, the delay functionality 214 delays the IP packets of the incoming IP flow 101 based on a position of the port 230.

Figure 13A:
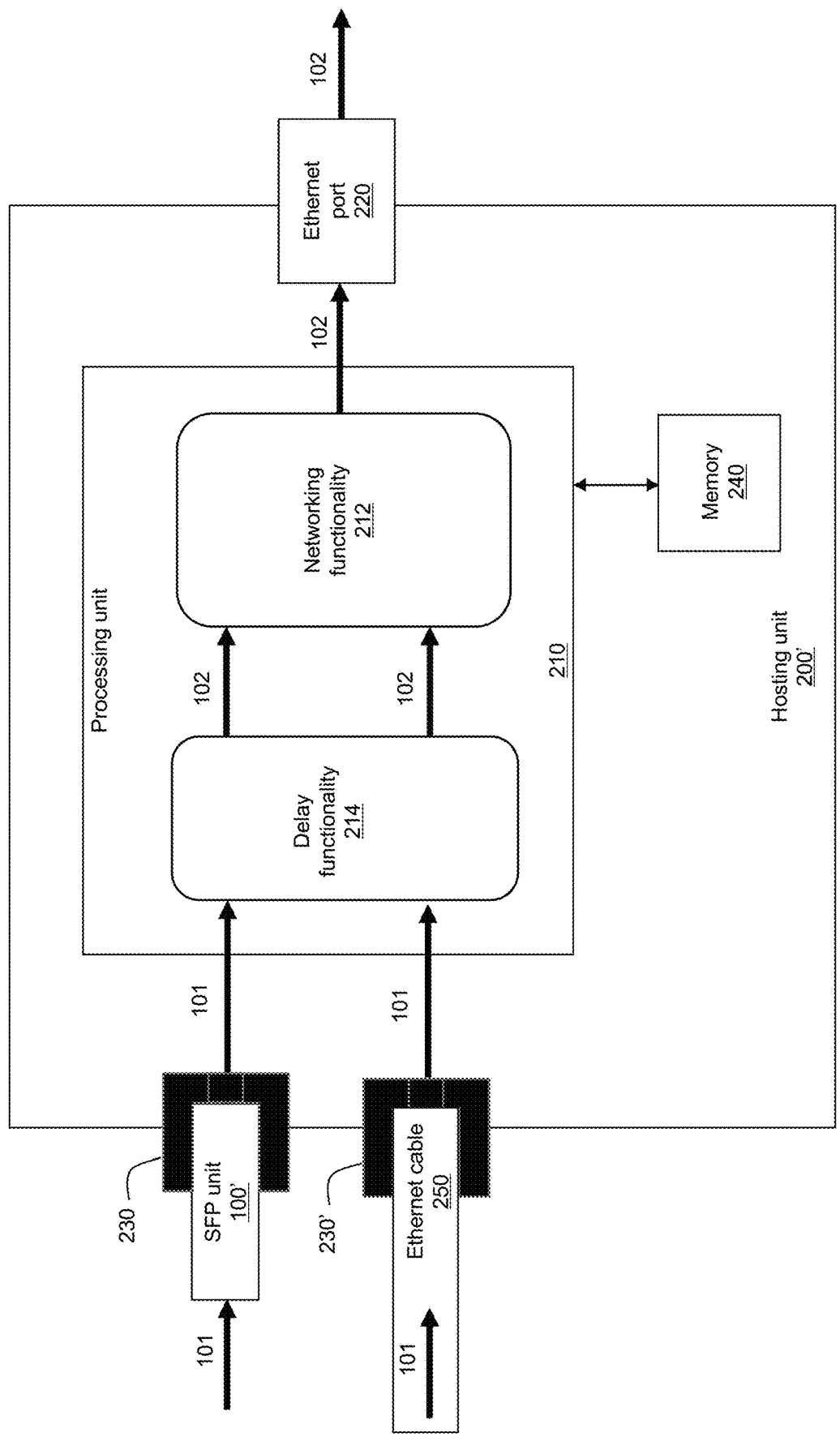
FIG. 13A represents an alternative hosting unit applying a delay based on a position of various types of ports.

FIG. 13A represents the hosting unit 200' comprising SFP port(s) 230 adapted for respectively receiving a SFP unit 100' (a single SFP port 230 is represented for simplification purposes). The hosting unit 200' further comprises Ethernet port(s) 230' adapted for respectively receiving an Ethernet cable 250 (a single Ethernet port 230' is represented for simplification purposes).

Figure 13B:
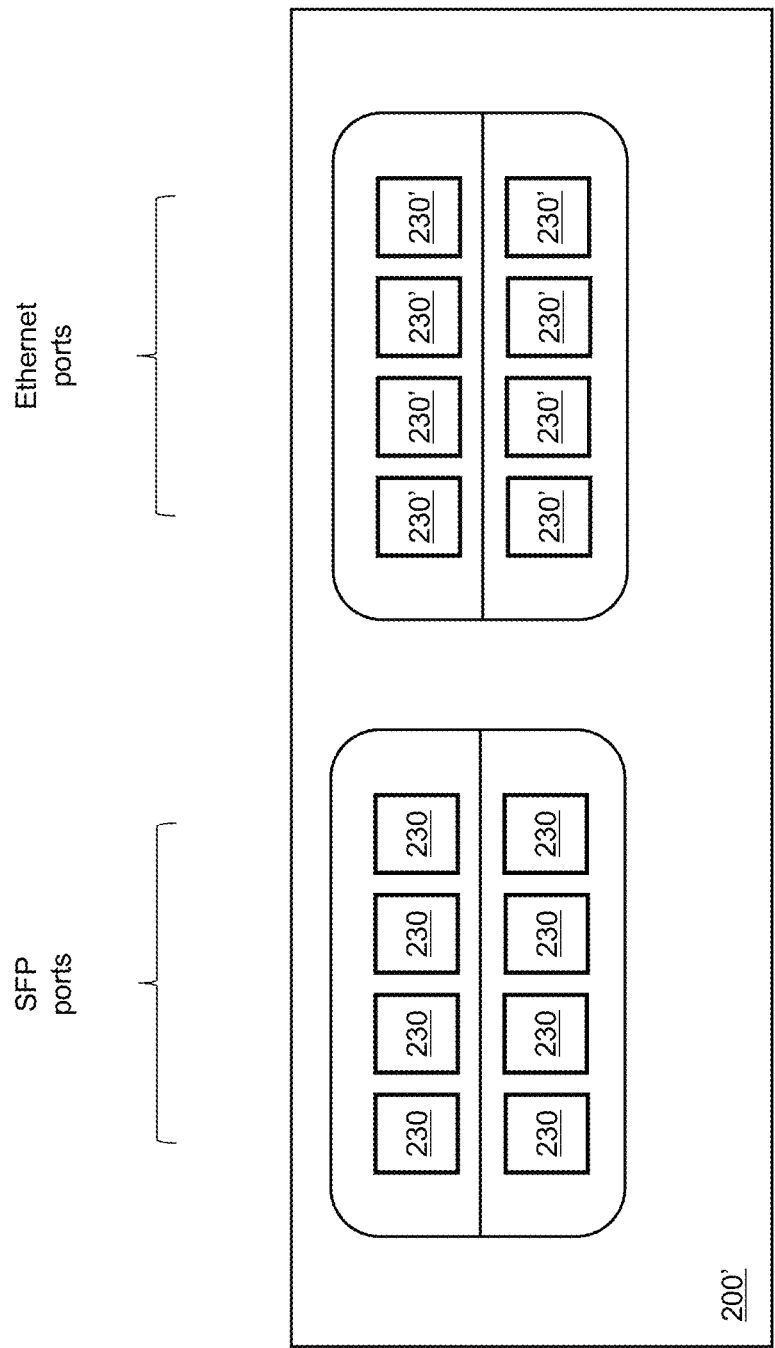
FIG. 13B represents a detailed layout of the ports of the hosting unit of FIG. 13A.

FIG. 13B represents the hosting unit 200' of FIG. 13A comprising 8 SFP ports 230 and 8 Ethernet port 230' for respectively receiving the IP flows 101.

Figure 13C:
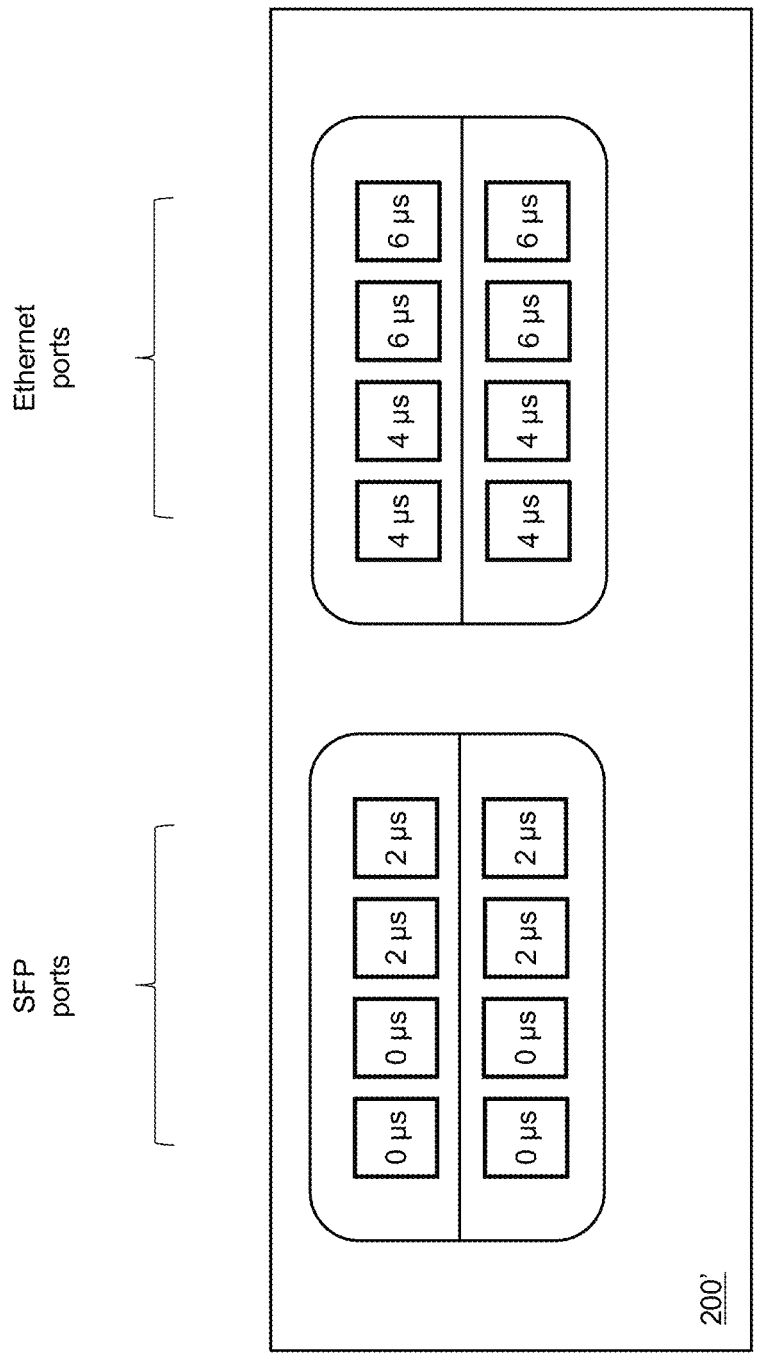
FIG. 13C represents exemplary delays based on the positions of the ports of the hosting unit of FIG. 13B.

FIG. 13C represents an exemplary configuration of the delays associated to the ports represented in FIG. 13B, based on their respective positions.

Use of a Neural Network for Determining the Delays

Figure 14:
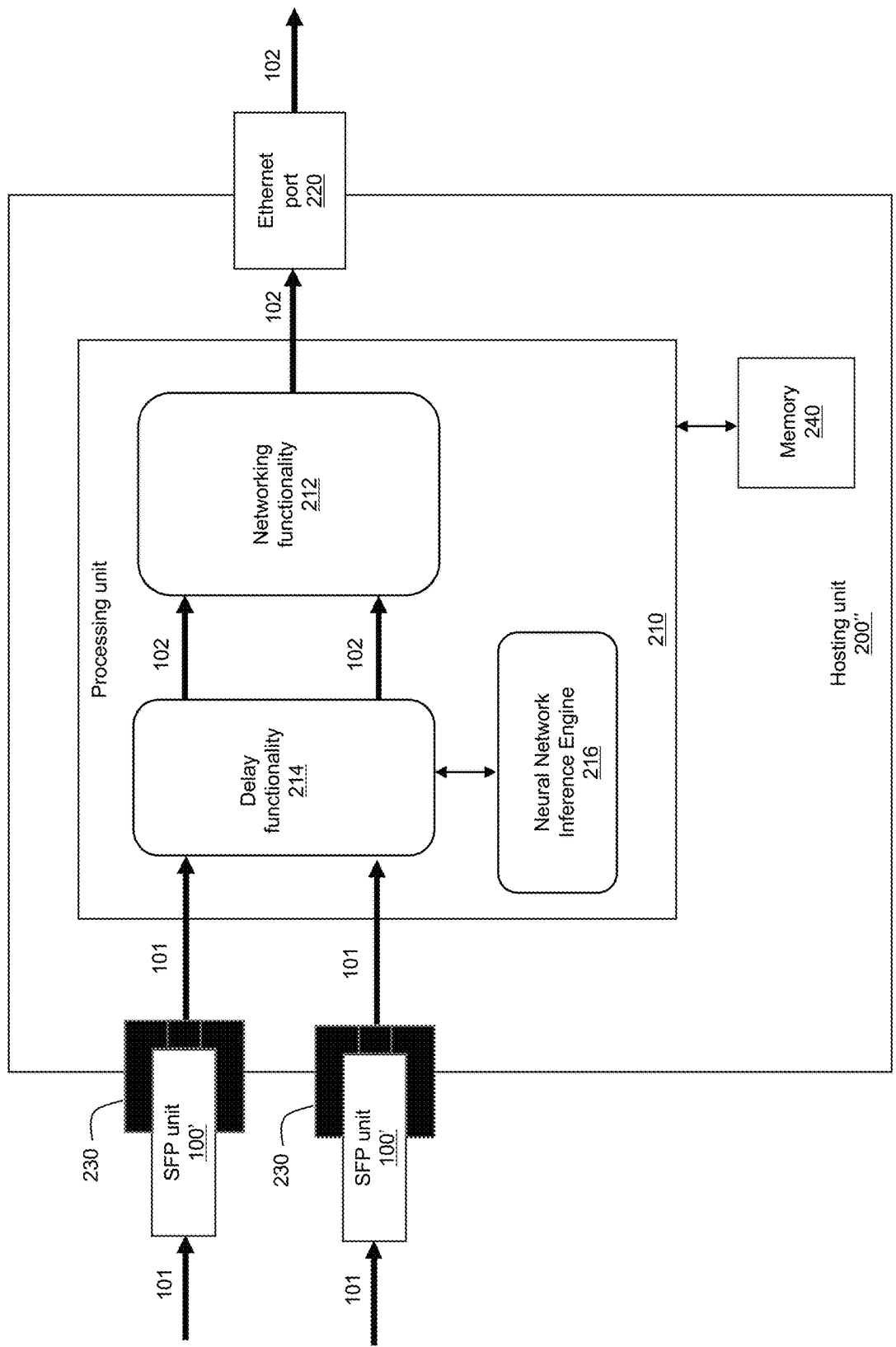
FIGS. 14 and 15 represent a neural network inference engine for inferring the delay applied by the hosting unit of FIG. 11.
Figure 15:
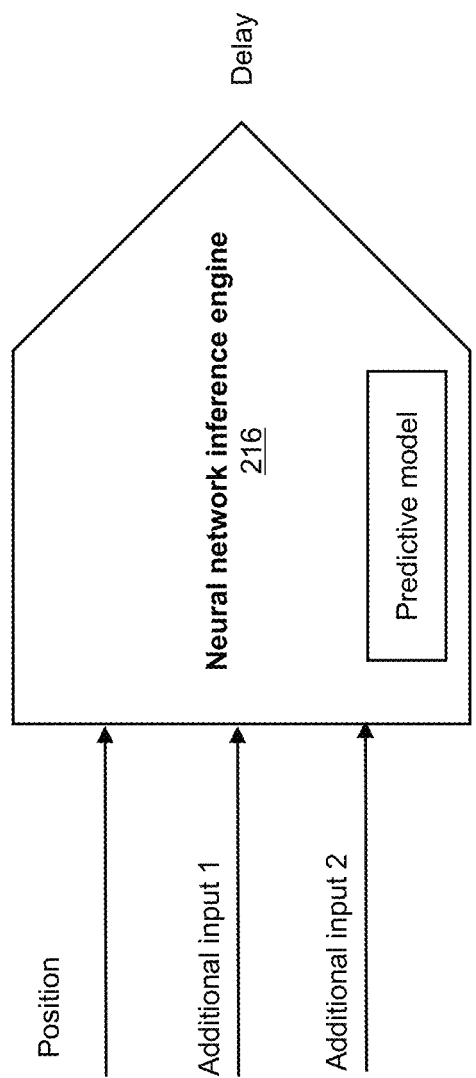

Referring now concurrently to FIGS. 12, 14 and 15, a hosting unit 200'' executing a neural network inference engine 216 is represented in FIG. 14. The hosting unit 200'' is similar to the hosting unit 200' represented in FIG. 11 (or FIG. 13A), except for the addition of the neural network inference engine 216 executed by the processing unit 210. A functional representation of the neural network inference engine 216 is provided in FIG. 15.

The processing unit 210 of the hosting unit 200'' executes the steps of the method 600 represented in FIG. 12.

Step 605 is not performed in this case.

Step 620 is performed by the delay functionality 214 for determining the position of the port 230 through which the IP packet is received at step 615.

Step 625 is performed by the neural network inference engine 216 for determining the delay corresponding to the position determined at step 620.

Step 630 is performed by the delay functionality 214 for applying the delay determined at step 625 to the IP packet received at step 615.

A neural network inference engine is well known in the art of artificial intelligence. As illustrated in FIG. 15, the neural network inference engine 216 uses a predictive model for inferring an output based on a plurality of inputs. The output consists of the delay to be applied at step 625. One of the inputs consists of the position determined at step 620. At least one additional input is used by the neural network inference engine 216. FIG. 15 represents two additional inputs for illustration purposes.

The usage of the neural network inference engine 216 at step 625 is not repeated for every packet received at step 615, but only if inputs of the neural network inference engine 216 change in a pre-determined manner (e.g. a variation of one of the inputs is greater than a pre-defined threshold). Thus, the same inferred delay can be re-used at step 625 for several consecutive packets received at step 615.

The predictive model is generated by a neural network training engine (not represented in the Figures for simplification purposes) during a training phase. When the training phase is completed, the predictive model is stored in the memory 240 of the hosting unit 200''. The predictive model includes the number of layers of the neural network, the number of nodes (also referred to as neurons) per layer, and the weights associated to each node. The first layer of nodes receives the inputs and the last layer of nodes calculates the outputs.

In a first implementation, the neural network training engine is executed by the processing unit 210 of the hosting unit 200'' during the training phase. The training is based on data collected during the operations of the hosting unit 200''. Once the training is completed, the generated predictive model is stored in the memory 240.

In an alternative implementation, the neural network training engine is executed by a dedicated training server (not represented in the Figures for simplification purposes) during the training phase. The training is based on data collected during the operations of the hosting unit 200''. The collected data are transmitted by the hosting unit 200'' to the training server. Once the training is completed, the generated predictive model is transmitted by the training server to the hosting unit 200'' and stored in the memory 240 of the hosting unit 200''. The training server may use data collected by a plurality of hosting units 200'' for generating the predictive model. The generated predictive model can be used by the plurality of hosting units 200''.

Various techniques well known in the art of neural networks are used for performing (and improving) the generation of the predictive model, such as forward and backward propagation, usage of bias in addition to the weights (bias and weights are generally collectively referred to as weights in the neural network terminology), reinforcement training, etc.

Examples of additional inputs used by the neural network inference engine 216 (in addition to the position) include a time during the day, a maximum throughput of the port 230 for which the delay is inferred, a current throughput (measured by the hosting unit 200") of the port 230 for which the delay is inferred, an aggregate maximum throughput of all the ports 230 for which delays are applied, an aggregate current throughput of all the ports 230 for which delays are applied, etc. One or more of these additional inputs are used in combination with the position to infer the delay.

During the training phase, the delays can be configured manually by a user to experimentally reach a combination of delays allowing a reduction of the bottleneck for processing the incoming IP flows 101. When a satisfying combination of delays is determined, the corresponding positions and additional inputs are collected in order to be used by the neural network training engine for the generation of the predictive model.

Figure 16:
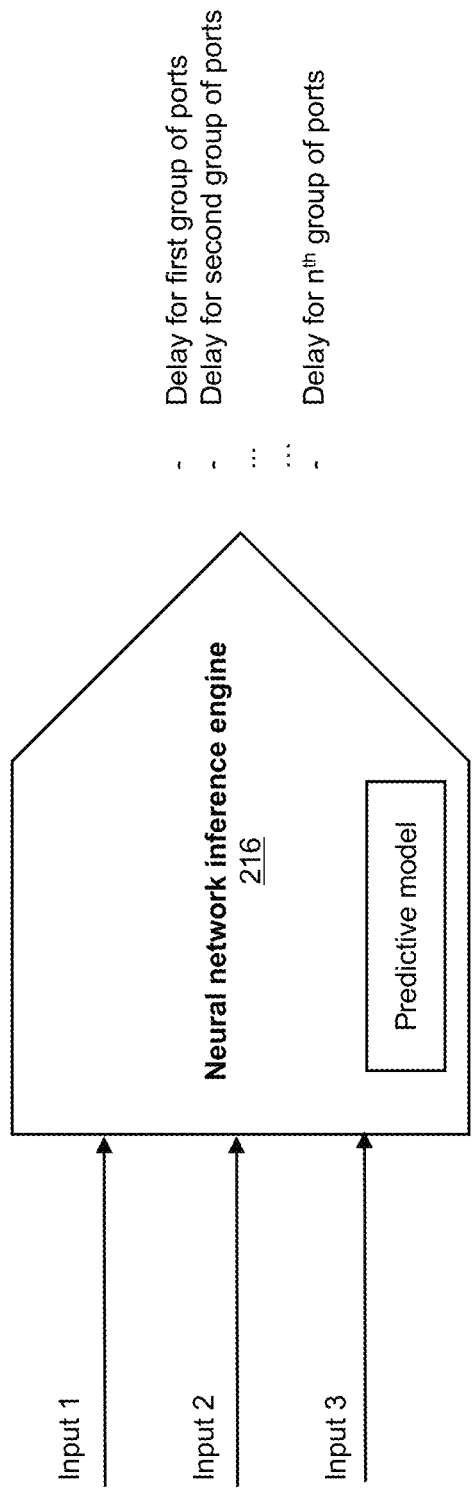
FIG. 16 represents an alternative implementation of the neural network inference engine of FIG. 14.

Referring now concurrently to FIGS. 12, 14 and 16, an alternative usage of the neural network inference engine 216 for inferring the delays associated to the ports is illustrated.

The ports 230 of the hosting unit 200" are divided into groups of ports having the same delay. Each port 230 belonging to a group is identified by its position within the hosting unit 200", as detailed previously.

The processing unit 210 of the hosting unit 200" executes the steps of the method 600 represented in FIG. 12.

During step 605, the neural network inference engine 216 is used for determining the delays mapped to the positions of the ports 230.

FIG. 16 illustrates the neural network inference engine 216 using a plurality of inputs (three are represented in FIG. 16 for illustration purposes) for inferring the outputs. The outputs consist of the delays respectively associated to each group of ports.

By contrast to FIG. 15, the position of a port is not an input of the neural network inference engine 216 and the output is not limited to the delay associated to the position of the port used as input.

Examples of inputs used by the neural network inference engine 216 represented in FIG. 16 include a time during the day, an aggregated maximum throughput for each group of ports 230 for which a delay is inferred, an aggregate current throughput (measured by the hosting unit 200") for each group of ports 230 for which the delay is inferred, an aggregate maximum throughput of all the ports 230 for which delays are applied, an aggregate current throughput of all the ports 230 for which delays are applied, etc. At least some of these exemplary inputs are used in combination by the neural network inference engine 216.

Step 605 is repeated to determine a new mapping if inputs of the neural network inference engine 216 change in a pre-determined manner (e.g. a variation of one of the inputs is greater than a pre-defined threshold).

The rest of the steps of the method 600 are not affected.

Orchestration Method and Orchestration Server for Determining Delays Based on Port Positions Referring now concurrently to FIGS. 7, 8A, 8B, 17 and 18, SFP units 100 (FIGS. 7, 8A, 8B and 17), hosting units 200 (FIGS. 8A, 8B and 17), an orchestration server 700 (FIG. 17) and an orchestration method 800 (FIG. 18) are represented. The SFP units 100 are adapted for being inserted into a port of the hosting units 200. The orchestration server 700 implements the method 800 for determining delays based on port positions.

Figure 17:
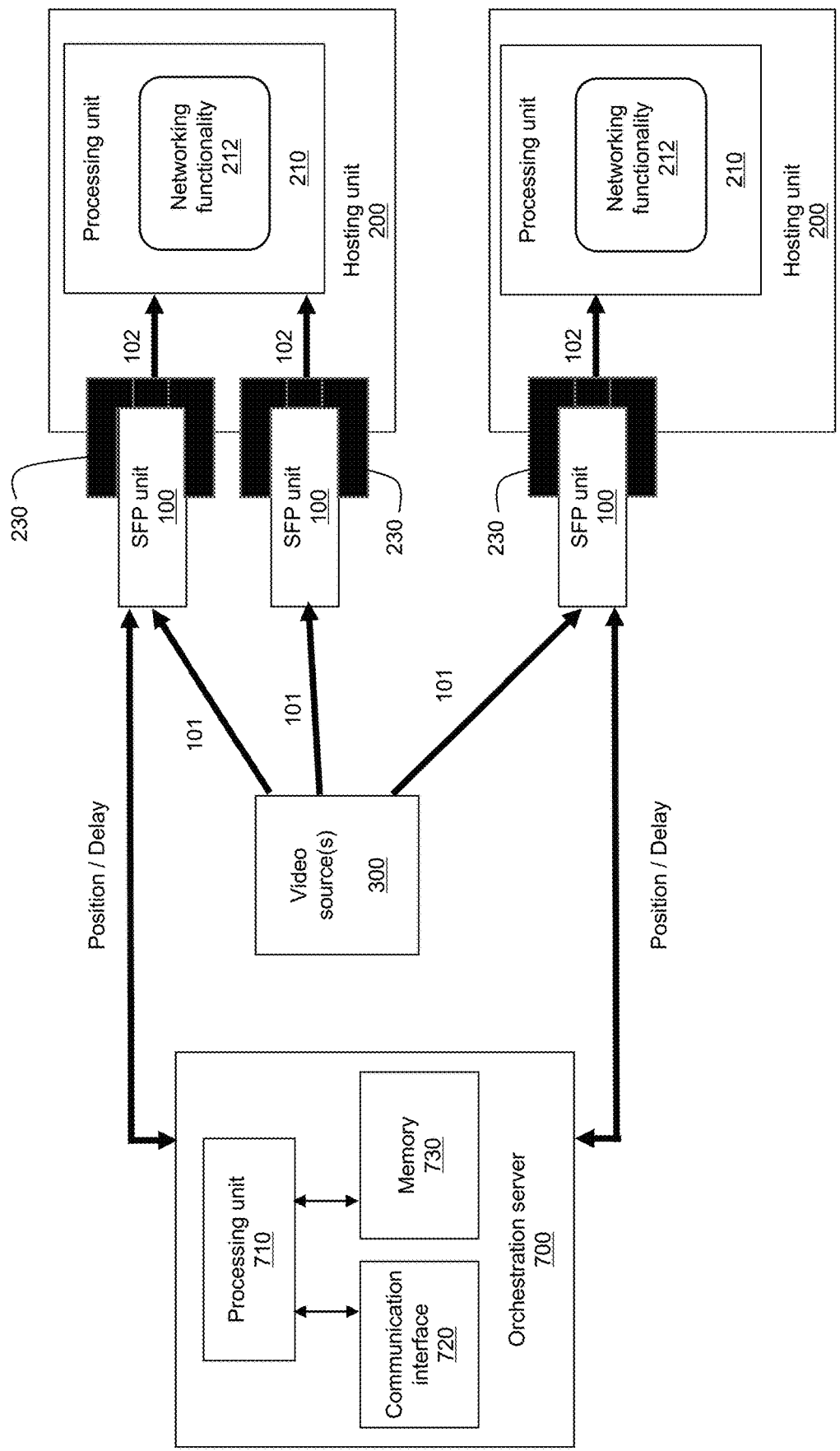
FIG. 17 represents an orchestration server for determining delays based on port positions.

With respect to the SFP units 100 and hosting units 200 represented in FIG. 17, they correspond to those represented in FIGS. 7, 8A and 8B. Only two hosting units 200 are represented in FIG. 17 for simplification purposes. However, any number of hosting units 200 may be hosting SFP units 100 under the control of the orchestration server 700. Furthermore, for each hosting unit 200, any number of SFP units 100 may be inserted into SFP ports of the hosting unit 200 and controlled by the orchestration server 700. For illustration purposes, FIG. 17 represents a first hosting unit 200 hosting two SFP units 100 under the control of the orchestration server 700; and a second hosting unit 200 hosting one SFP unit 100 under the control of the orchestration server 700.

In a manner similar to the one described in relation to FIG. 8A, the one or more video source 300 generates a plurality of video IP flows 101. The plurality of video IP flows 101 are received by the plurality of SFP units 100 and delayed into a corresponding plurality of delayed video IP flows 102. The plurality of delayed video IP flows 102 are transmitted to the hosting units 200 and processed by the processing units 210 of the hosting units 200 (e.g. by the networking functionalities 212 executed by the processing units 210).

Figure 18:
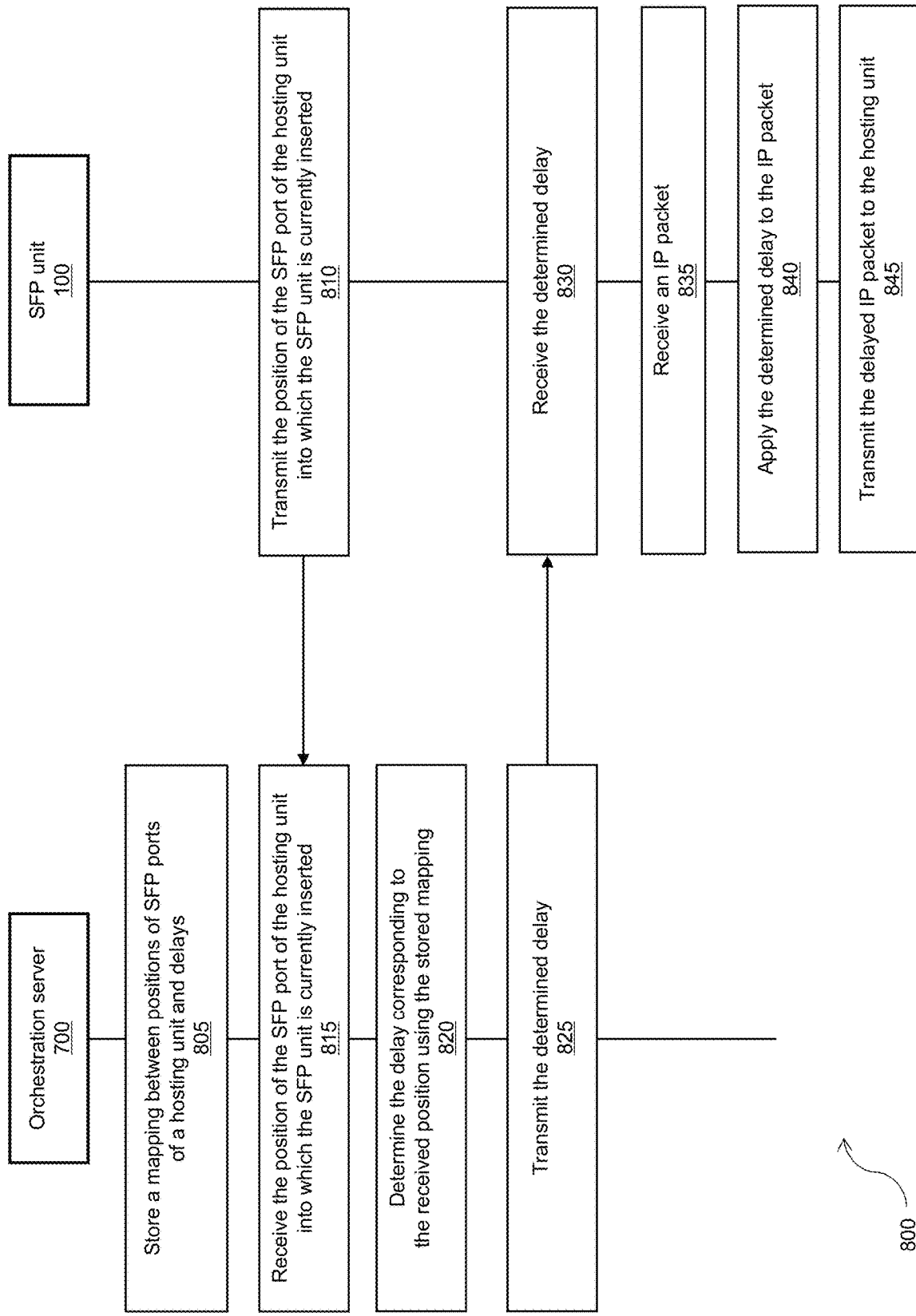
FIG. 18 represents a method for determining delays based on port positions implemented by the orchestration server of FIG. 17.

However, in the context of the configuration illustrated in FIGS. 17 and 18, the delay functionality 112 (represented in FIG. 7) implemented by the SFP units 100 is limited to applying the delays, and the orchestration server 700 is responsible for determining the applied delays.

The orchestration server 700 comprises a processing unit 710, a communication interface 720, memory 730, optionally a user interface and a display not represented in FIG. 17 for simplification purposes.

The processing unit 710 comprises one or more processor (not represented in FIG. 17) capable of executing instructions of a computer program. Each processor may further comprise one or several cores.

The memory 730 stores instructions of computer program(s) executed by the processing unit 710, data generated by the execution of the computer program(s), data received via the communication interface 720, etc. Only a single memory 730 is represented in FIG. 17, but the orchestration server 700 may comprise several types of memories, including volatile memory (such as a volatile Random Access Memory (RAM), etc.) and non-volatile memory (such as a hard drive, electrically-erasable programmable read-only memory (EEPROM), etc.).

The communication interface 720 allows the orchestration server 700 to exchange data with several devices (e.g. the SFP units 100, the hosting units 200, etc.) over one or more communication network (not represented in FIG. 17 for simplification purposes). The term communication interface 720 shall be interpreted broadly, as supporting a single communication standard/technology, or a plurality of communication standards/technologies. Examples of communication interfaces 720 include a wireless (e.g. Wi-Fi, cellular, wireless mesh, etc.) communication module, a wired (e.g. Ethernet) communication module, a combination of wireless and wired communication modules, etc. In an exemplary configuration, the communication interface 720 of the orchestration server 700 has a first wired (e.g. Ethernet) communication module for exchanging data with the SFP units 100 and the hosting units 200; and a second wireless (e.g. Wi-Fi) communication module for exchanging data with other computing devices not represented in FIG. 17. The communication interface 720 usually comprises a combination of hardware and software executed by the hardware, for implementing the communication functionalities of the communication interface 720.

A dedicated computer program has instructions for implementing the steps of the method 800 executed by the processing unit 710 of the orchestration server 700. The instructions are comprised in a non-transitory computer program product (e.g. the memory 730) of the orchestration server 700. The instructions, when executed by the processing unit 710 of the orchestration server 700, provide for determining delays based on port positions. The instructions are deliverable to the orchestration server 700 via an electronically-readable media such as a storage media (e.g. CD-ROM, USB key, etc.), or via communication links (e.g. via a communication network through the communication interface 720).

Some of the steps of the method 800 are implemented by the orchestration server 700, while the other steps are implemented by one of the SFP units 100 represented in FIG. 17.

The method 800 comprises the step 805 of storing a mapping between positions of SFP ports of a hosting unit 200 and delays. Step 805 is executed by the processing unit 710 of the orchestration server 700.

As mentioned previously, the configuration of the orchestration server 700 with the mapping between the positions and the corresponding delays is performed via one or more configuration message transmitted to the orchestration server 700. For example, configuration messages are transmitted by the hosting units 200. Alternatively, a single configuration message is transmitted by another computing device not represented in the Figures. The mapping between the positions and the corresponding delays is stored in the memory 730 of the orchestration server 700 upon reception of the configuration message(s). In still another alternative, the mapping between the positions and the corresponding delays is generated based on interactions with a user through a user interface of the orchestration server 700, the user providing the mapping between the positions and the corresponding delays.

The method 800 comprises the step 810 of transmitting (via the front connector 20 or 21, or alternatively via the rear connector 17 indirectly through the hosting unit 200) the position of the SFP port 230 (of the hosting unit 200) into which the SFP unit 100 is currently inserted. Step 810 is executed by the processing unit 110 of the SFP unit 100.

The method 800 comprises the step 815 of receiving (via the communication interface 720) the position of the SFP port 230 (of the hosting unit 200) into which the SFP unit 100 is currently inserted. Step 815 is executed by the processing unit 710 of the orchestration server 700.

The method 800 comprises the step 820 of determining the delay corresponding to the position received at step 815, using the mapping stored at step 805. Step 820 is executed by the processing unit 710 of the orchestration server 700.

The method 800 comprises the step 825 of transmitting (via the communication interface 720) the delay determined at step 820. Step 825 is executed by the processing unit 710 of the orchestration server 700.

The method 800 comprises the step 830 of receiving (via the front connector 20 or 21, or alternatively via the rear connector 17 indirectly through the hosting unit 200) the delay transmitted at step 825. Step 830 is executed by the processing unit 110 of the SFP unit 100.

The method 800 comprises the step 835 of receiving an IP packet. Step 835 is executed by the processing unit 110 of the SFP unit 100. As described previously, the IP packet belongs to an IP flow 101 received via the front connector 20 (or optionally to an IP flow 101 received via another front connector 21).

The method 800 comprises the step 840 of applying the delay received at step 830 to the IP packet received at step 835. Step 840 is executed by the processing unit 110 of the SFP unit 100.

The method 800 comprises the step 845 of transmitting the IP packet delayed at step 840 to the hosting unit 200. Step 845 is executed by the processing unit 110 of the SFP unit 100. As described previously, the delayed IP packet belongs to a delayed IP flow 102 transmitted via the rear connector 17.

Steps 835 to 845 are repeated for each IP packet belonging to an IP flow 101 received by the SFP unit 100.

If the SFP unit 100 is inserted into a different SFP port 230 of the hosting unit 200, steps 810 to 830 are repeated.

Although a single SFP unit 100 is represented in FIG. 18, steps 810 to 845 are performed for a plurality of SFP units 100 inserted in one or more hosting units 200, as illustrated in FIG. 17.

A discovery message comprising the position is transmitted from the SFP unit 100 to the orchestration server 700 when steps 810 and 815 are executed. The discovery message may include additional information, such as for example an identification of the SFP unit 100.

A discovery response message comprising the delay is transmitted from the orchestration server 700 to the SFP unit 100 when steps 825 and 830 are executed. The discovery response message may include additional information, such as a timing for starting to apply the delay.

As mentioned previously, the discovery message used for transmitting the position from the SFP unit 100 to the orchestration server 700 may be compliant with the LLDP standard. Additionally, the discovery response message for transporting the delay from the orchestration server 700 to the SFP unit 100 may also be compliant with the LLDP standard.

As mentioned previously and illustrated in FIGS. 9B and 9C, several SFP ports 230 of the hosting unit 200 may have the same delay.

As mentioned previously, the method 800 is not limited to the SFP units 100; but can be extended to any type of standardized hot-pluggable transceiving units comprising a housing with standardized dimensions. The method 800 also applies to any transceiving unit 100 adapted to being inserted into a corresponding port 230 of the hosting unit 200. The only constraint is that the transceiving unit 100 and the corresponding insertion port 230 of the hosting unit 200 have compatible characteristics (e.g. in terms of shape, electrical interfaces, etc.).

In a particular implementation not represented in FIGS. 17 and 18, the processing unit 710 of the orchestration server 700 executes the neural network inference engine 216 represented in FIGS. 14, 15 and 16 for inferring the delays to be applied based on input parameters transmitted by the SFP units 100 and/or the hosting units 200. The same type of input parameters, which have been previously described in relation to FIGS. 14, 15 and 16, are used in the context of the orchestration server 700 and the orchestration method 800.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A transceiving unit comprising:
   a housing adapted to being inserted into a port of a hosting unit, the hosting unit comprising a plurality of ports;

at least one connector located on a front panel of the housing for receiving Internet Protocol (IP) packets;
a processing unit in the housing for:
determining a delay, the determined delay being based on a position of the port into which the housing is inserted among the plurality of ports of the hosting unit; and
applying the determined delay to the IP packets; and
a rear connector located on a back panel of the housing for transmitting the delayed IP packets to the hosting unit.

2. The transceiving unit of claim 1, wherein the transceiving unit is a standardized hot-pluggable transceiving unit and the housing has standardized dimensions.

3. The transceiving unit of claim 1, wherein the position of the port into which the housing is inserted among the plurality of ports of the hosting unit is determined via a discovery protocol.

4. The transceiving unit of claim 3, wherein the discovery protocol is the Link Layer Discovery Protocol (LLDP).

5. The transceiving unit of claim 1, further comprising memory for storing a mapping between positions of the plurality of ports of the hosting unit and corresponding delays to be applied to the received IP packets, the processing unit using the mapping for determining of the delay.

6. The transceiving unit of claim 5, wherein the mapping is received by the transceiving unit via a configuration message.

7. The transceiving unit of claim 5, wherein several ports among the plurality of ports of the hosting unit have the same corresponding delay to be applied to the received IP packets.

8. The transceiving unit of claim 1, wherein the determination of the delay by the processing unit consists in receiving the delay from the hosting unit.

9. The transceiving unit of claim 1, wherein the received IP packets transport a video payload.

10. A networking device comprising:
a plurality of ports for receiving Internet Protocol (IP) packets; and
a processing unit for:
determining a delay for the IP packets received via one port among the plurality of ports, the determined delay being based on a position of the one port among the plurality of ports; and
applying the determined delay to the IP packets received via the one port among the plurality of ports.

11. The networking device of claim 10, wherein at least some among the plurality of ports are adapted for receiving transceiving units, the transceiving units comprising a housing adapted for insertion into the at least some among the plurality of ports.

12. The networking device of claim 11, wherein at least some among the transceiving units are standardized hot-pluggable transceiving units comprising a housing having standardized dimensions.

13. The networking device of claim 10, further comprising memory for storing a mapping between positions of the plurality of ports and corresponding delays to be applied to the received IP packets, the processing unit using the mapping for determining of the delay.

14. The networking device of claim 13, wherein the mapping is received by networking device via a configuration message or is configured by a user via a user interface of the networking device.

15. The networking device of claim 13, wherein several ports among the plurality of ports have the same delay to be applied to the received IP packets.

16. The networking device of claim 10, wherein the received IP packets transport a video payload.

17. The networking device of claim 10, wherein several IP packets are received via several different ports among the plurality of ports, and the delay determined for each one of the several IP packets is based on the respective positions of the several different ports among the plurality of ports.

18. An orchestration method for determining delays based on port positions, the method comprising:
receiving by a processing unit of an orchestration server via a communication interface of the orchestration server a discovery message from a transceiving unit inserted into a port of a hosting unit, the hosting unit comprising a plurality of ports, the discovery message comprising a position of the port into which the transceiving unit is inserted among the plurality of ports of the hosting unit;
determining by the processing unit of the orchestration server a delay based on the position of the port into which the transceiving unit is inserted among the plurality of ports of the hosting unit; and
transmitting by the processing unit of the orchestration server via the communication interface of the orchestration server a discovery response message to the transceiving unit, the discovery response message comprising the determined delay.

19. The method of claim 18, wherein the transceiving unit is a standardized hot-pluggable transceiving unit comprising a housing, the housing having standardized dimensions and being adapted for insertion into the port of the hosting unit.

20. The method of claim 18, wherein the processing unit of the orchestration server receives a plurality of discovery messages from a plurality of transceiving units inserted into one or more hosting unit, the processing unit of the orchestration server transmits a corresponding plurality of discovery response messages to the plurality of transceiving units, each discovery message comprising the position of the port into which the transceiving unit is inserted and each corresponding discovery response message comprising the corresponding delay determined based on the position.

21. The method of claim 18, wherein the discovery message is compliant with the Link Layer Discovery Protocol (LLDP).

22. The method of claim 18, further comprising storing a mapping between positions of the plurality of ports of the hosting unit and corresponding delays in a memory of the orchestration server, the processing unit using the mapping for determining of the delay.

23. The method of claim 22, wherein the mapping is received by the orchestration server via one or more configuration message.

24. The method of claim 22, wherein several ports among the plurality of ports of the hosting unit have the same corresponding delay.

25. The method of claim 18, further comprising applying by a processing unit of the transceiving unit the determined delay to Internet Protocol (IP) packets received via at least one front connector located on a front panel of a housing of the transceiving unit.

26. The transceiving unit of claim 1, wherein dimensions of the housing are compliant with one of the following standards: Small Form-factor Pluggable (SFP), 10 Gigabit SFP (XFP), or Quad SFP (QSFP).

27. The transceiving unit of claim 1, wherein the hosting unit consists of one of the following: a switch, a router, a gateway or a server.

\* \* \* \* \*